US011214733B2

(12) United States Patent
Park et al.

(10) Patent No.: US 11,214,733 B2
(45) Date of Patent: *Jan. 4, 2022

(54) SURFACE-PASSIVATED QUANTUM DOTS AND METHOD FOR PASSIVATING SURFACE OF QUANTUM DOTS

(71) Applicant: UNIST (ULSAN NATIONAL INSTITUTE OF SCIENCE AND TECHNOLOGY), Ulsan (KR)

(72) Inventors: Jong Nam Park, Ulsan (KR); Yo Han Suh, Ulsan (KR); Tae Yun Kim, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 316 days.

This patent is subject to a terminal disclaimer.

(21) Appl. No.: 16/464,433

(22) PCT Filed: Jan. 12, 2017

(86) PCT No.: PCT/KR2017/000416
§ 371 (c)(1),
(2) Date: May 28, 2019

(87) PCT Pub. No.: WO2018/101535
PCT Pub. Date: Jun. 7, 2018

(65) Prior Publication Data
US 2020/0339875 A1    Oct. 29, 2020

(30) Foreign Application Priority Data

Nov. 29, 2016  (KR) .................. 10-2016-0159939

(51) Int. Cl.
*C09K 11/06*    (2006.01)
*C09K 11/66*    (2006.01)
(Continued)

(52) U.S. Cl.
CPC ............... *C09K 11/06* (2013.01); *B05D 5/00* (2013.01); *C09K 11/025* (2013.01);
(Continued)

(58) Field of Classification Search
CPC ............... C09K 11/025; C09K 11/664; C09K 11/665; B05D 5/00; B82Y 20/00; B82Y 30/00; B82Y 40/00
See application file for complete search history.

(56) References Cited

U.S. PATENT DOCUMENTS 9,324,562 B1    4/2016  Luther et al.
9,425,396 B2 *  8/2016  Irwin ...................... C23C 16/50
(Continued)

FOREIGN PATENT DOCUMENTS

KR       10-1447238         10/2014
KR    10-2016-0055094         5/2016
(Continued)

OTHER PUBLICATIONS

Hee Chang Yoon et al., "Study of Perovskite QD Down-Converted LEDs and Six-Color White LEDs for Future Displays with Excellent Color Performance", ACS Appl. Mater. Interfaces, vol. 8, No. 28, p. 18189-18200, 2016.
(Continued)

*Primary Examiner* — C Melissa Koslow
(74) *Attorney, Agent, or Firm* — Lex IP Meister, PLLC

(57) ABSTRACT

The present invention provides a quantum dot of which a surface is passivated with a short chain ligand, and a method of passivating a surface of the quantum dot using a ligand exchange reaction.

22 Claims, 16 Drawing Sheets

(51) Int. Cl.
*C09K 11/02* (2006.01)
*B05D 5/00* (2006.01)
*B82Y 20/00* (2011.01)
*B82Y 30/00* (2011.01)
*B82Y 40/00* (2011.01)

(52) U.S. Cl.
CPC .......... *C09K 11/664* (2013.01); *C09K 11/665* (2013.01); *B82Y 20/00* (2013.01); *B82Y 30/00* (2013.01); *B82Y 40/00* (2013.01); *C09K 2211/183* (2013.01); *C09K 2211/188* (2013.01)

(56) References Cited

U.S. PATENT DOCUMENTS

| | | | |
|---|---|---|---|
| 9,701,696 B2 * | 7/2017 | Zhu | C07F 7/24 |
| 10,193,088 B2 * | 1/2019 | Lee | H01L 51/0037 |
| 10,923,688 B2 * | 2/2021 | Park | H01L 51/56 |

FOREIGN PATENT DOCUMENTS

| | | | |
|---|---|---|---|
| KR | 10-2016-0100355 | | 8/2016 |
| WO | 2016-070713 | | 5/2016 |
| WO | WO 2016/072805 | * | 5/2016 |

OTHER PUBLICATIONS

Jun Pan et al., "Highly Efficient Perovskite-Quantum-Dot Light-Emitting Diodes by Surface Engineering", Advanced Materials, vol. 28, p. 8718-8725, 2016.

Feng Wang et al., "Phenylalkylamine Passivation of Organolead Halide Perovskites Enabling High-Efficiency and Air-Stable Photovoltaic Cells", Advanced Materials, 2016, vol. 28, No. 45, p. 9986-9992, Fig 1, 2.

Jun Pan et al., "Air-Stable Surface-Passivated Perovskite Quantum Dots for Ultra-Robust, Single- and Two-Photon-Induced Amplified Spontaneous Emission", The Journal of Phys. Chem. Letters, 2015, vol. 6, No. 24, p. 5027-5033.

Guangru Li et al, "Highly Effi cient Perovskite Nanocrystal Light-Emitting Diodes Enabled by a Universal Crosslinking Method", Advanced materials, 2016, vol. 28, No. 18, p. 3528-3534.

Feng Zhang et al., "Brightly Luminescent and Color-Tunable Colloidal $CH_3NH_3PbX_3$ (X=Br, I, Cl) Quantum Dots: Potential Alternatives for Display Technology", ACS Nano, vol. 9, No. 4, p. 4533-4542.

Junnian Chen et al., "Crystal organometai halide perovskites with promising optoelectronic applications", Journal of Materials Chemistry C, 2016. vol. 4, p. 11-27.

Loredana Protesescu et al., "Nanocrystals of Cesium Lead Halide Perovskites ($CsPbX_3$, X=Cl, Br, and I): Novel Optoelectronic Materials Showing Bright Emission with Wide Color Gamut", Nano letters, 2015, vol. 15, p. 3692-3696.

Woon Seok Yang et al., "High-performance photovoltaic perovskite layers fabricated through intramolecular exchange", Science, Jun. 12, 2015, vol. 348, Issue 6240, p. 1234-1237.

Xiaoming Li et al., "$CsPbX_3$ Quantum Dots for Lighting and Displays: Room-Temperature Synthesis, Photoluminescence Superiorities, Underlying Origins and White Light-Emitting Diodes", Advanced Functional Materials, 2016, vol. 26, p. 2435-2445.

Himchan Cho et al, "Overcoming the electroluminescence efficiency limitations of perovskite light-emitting diodes", Science, Dec. 4, 2015, vol. 350, Issue 6265, p. 1222-1225.

Jun Hong Noh et al., "Chemical Management for Colorful, Efficient, and Stable Inorganic-Organic Hybrid Nanostructured Solar Cells", ACS, Nano letters, 2013, vol. 13, p. 1764-1769.

Georgian Nedelcu et al., "Fast Anion-Exchange in Highly Luminescent Nanocrystals of Cesium Lead Halide Perovskites ($CsPbX_3$, X=Cl, Br, I)", ACS, Nano letters, 2015, vol. 15, p. 5635-5640.

Younghoon Kim et al., "Efficient Luminescence from Perovskite Quantum Dot Solids", ACS applied materials & interfaces, 2015, vol. 7, p. 25007-25013.

Yehonadav Bekenstein et al., "Highly Luminescent Colloidal Nanoplates of Perovskite Cesium Lead Halide and Their Oriented Assemblies", J. AM. Chem. Soc., 2015, vol. 137, p. 16008-16011.

Dandan Zhang et al., "Solution-Phase Synthesis of Cesium Lead Halide Perovskite Nanowires", J. AM. Chem Soc., 2015, vol. 137, p. 9230-9233.

Jizhong Song et al., "Quantum Dot Light-Emitting Diodes Based on Inorganic Perovskite Cesium Lead Halides ($CsPbX_3$)", Advanced materials, 2015, vol. 27, p. 7162-7167.

Xiaoyu Zhang et al., "Enhancing the Brightness of Cesium Lead Halide Perovskite Nanocrystal Based Green Light-Emitting Devices through the Interface Engineering with Perfluorinated Ionomer" ACS, Nano letters, 2016, vol. 16, p. 1415-1420.

Jonathan De Roo et al., "Highly Dynamic Ligand Binding and Light Absorption Coefficient of Cesium Lead Bromide Perovskite Nanocrystals", ACS Nano, 2016, vol. 10, p. 2071-2081.

Cherie R. Kagan et al., "Building devices from colloidal quantum dots", Science, Aug. 26, 2016, vol. 353, Issue 6302.

Cherie R. Kagan et al., "Charge transport in strongly coupled quantum dot solids", Nature nanotechnology, Dec. 2015, Vo.10, p. 1013-1026.

Yo-Han Suh et al, "High-Performance $CsPbX_3$ Perovskite Quantum-Dot Light-Emitting Devices via Solid-State Ligand Exchange", ACS Appl. Nano Mater., 2018, vol. 1, p. 488-496.

* cited by examiner

[Figure 1]
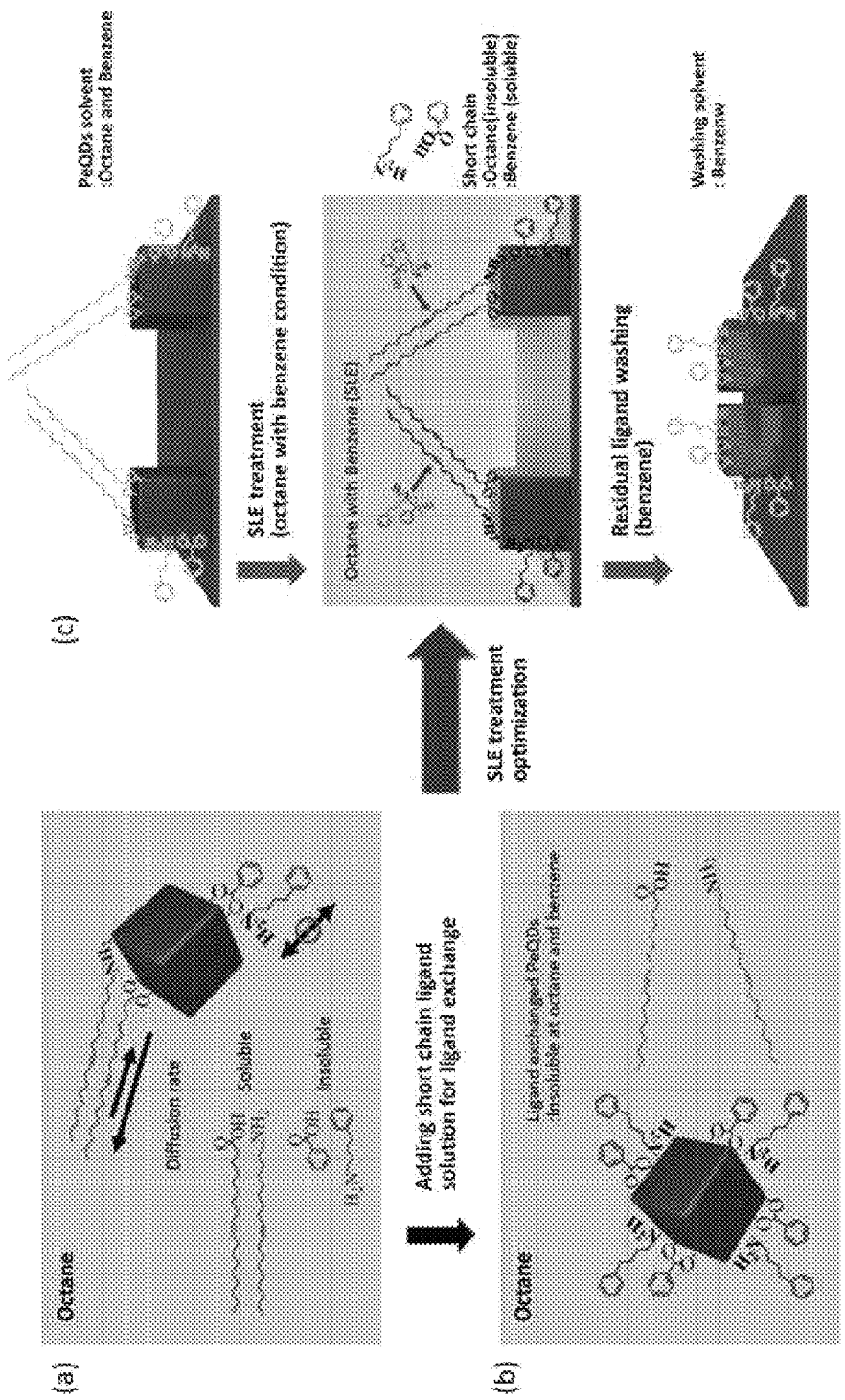

[Figure 2a]
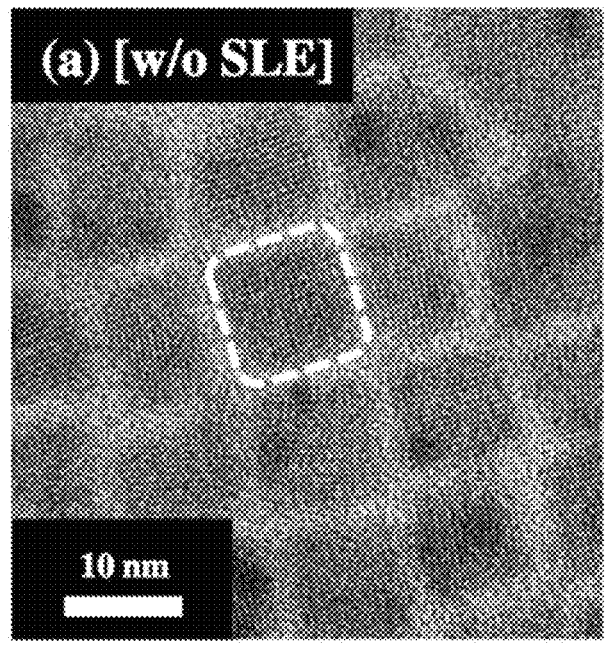
[Figure 2b]
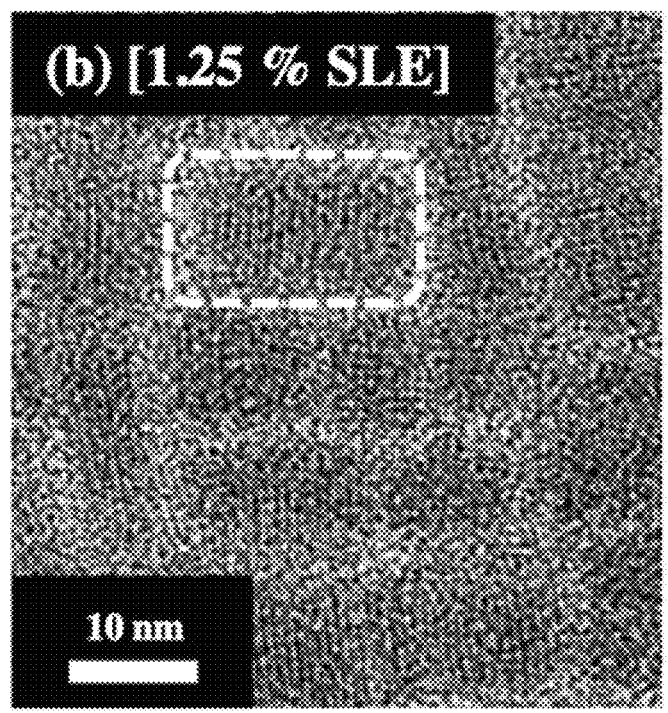

[Figure 2c]
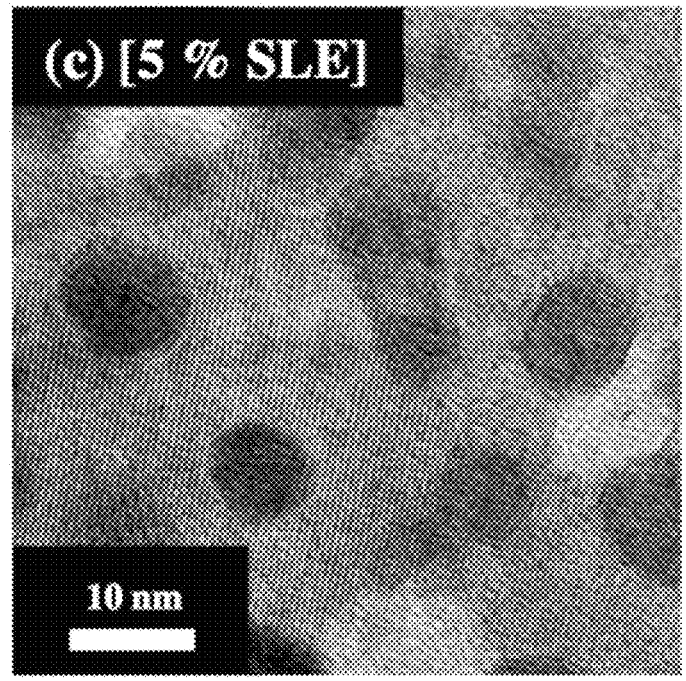
[Figure 2d]
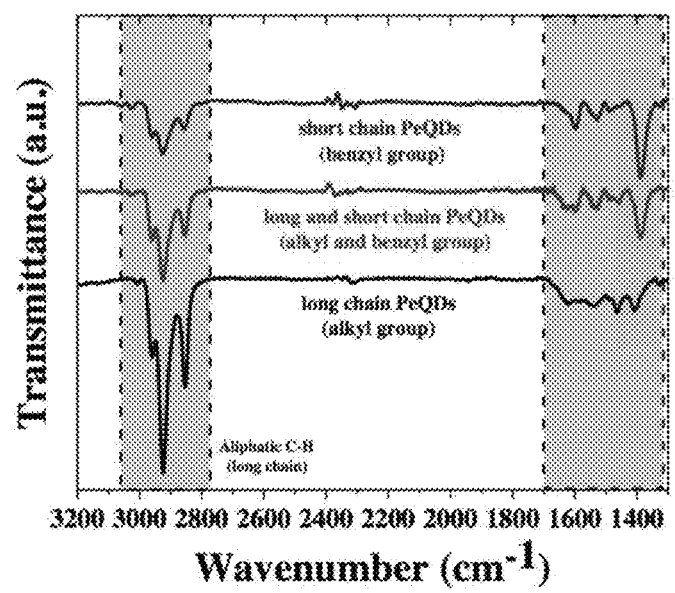

[Figure 2e]
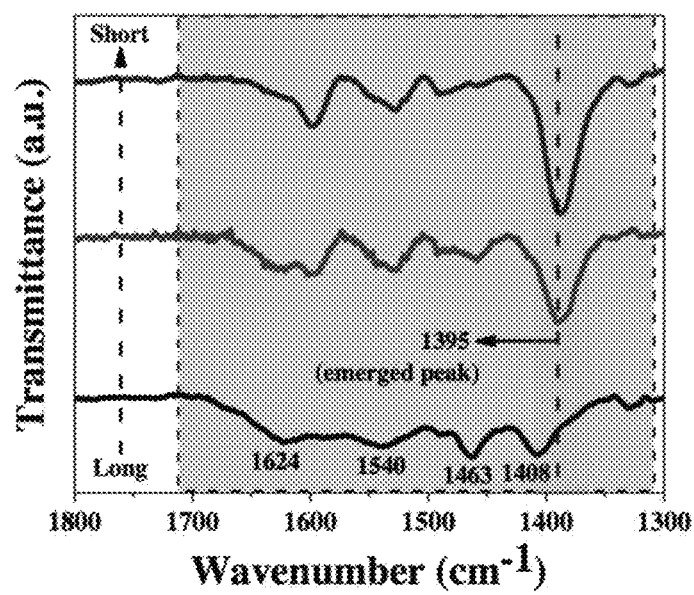
[Figure 3a]
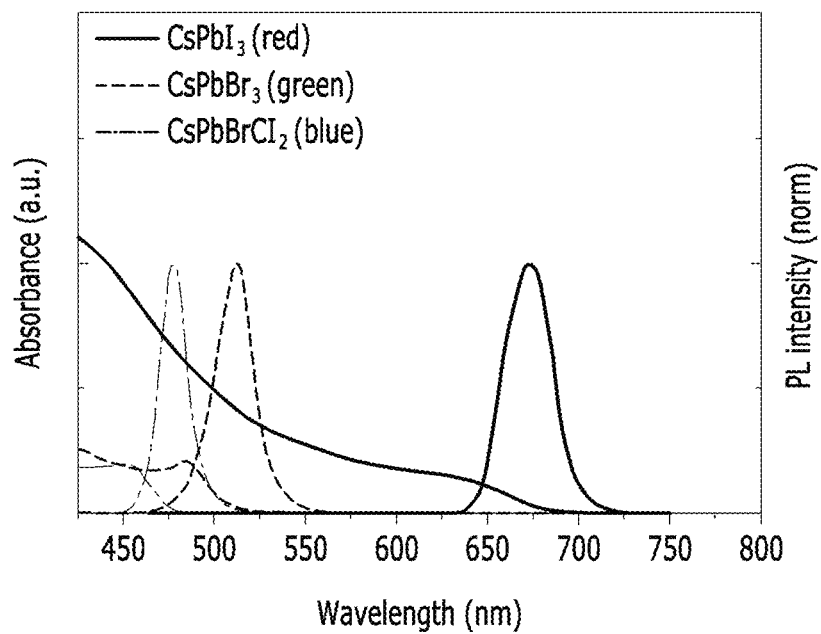

【Figure 3b】
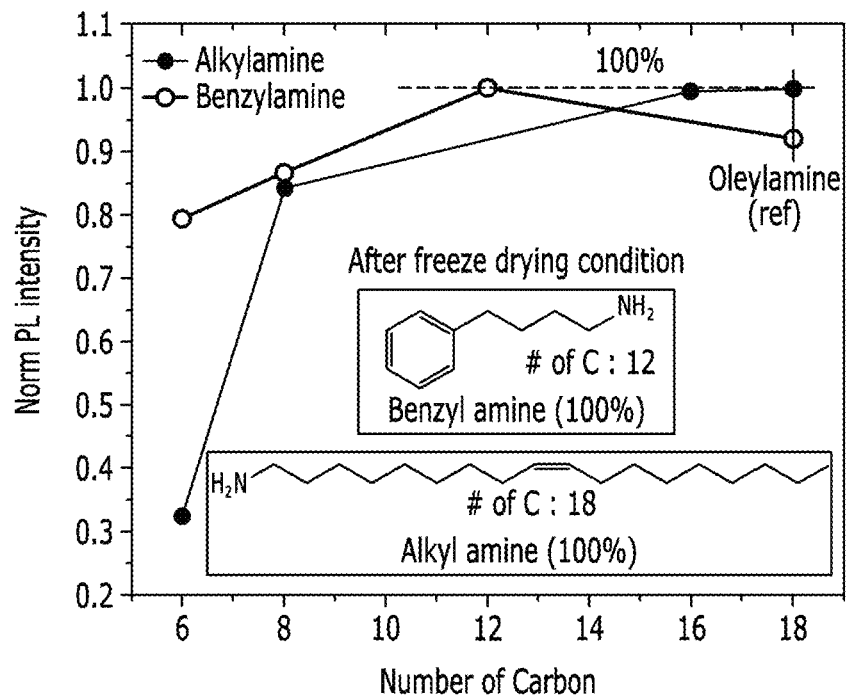
【Figure 3c】
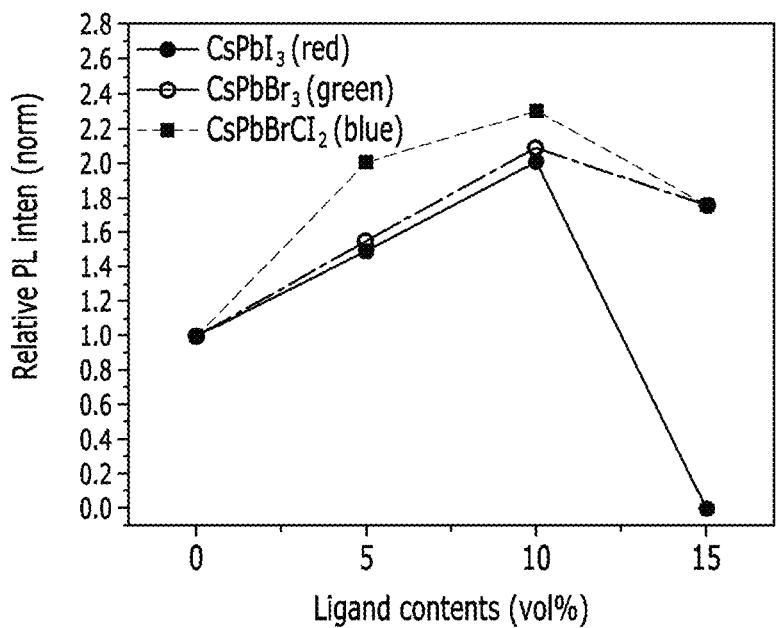

[Figure 3d]
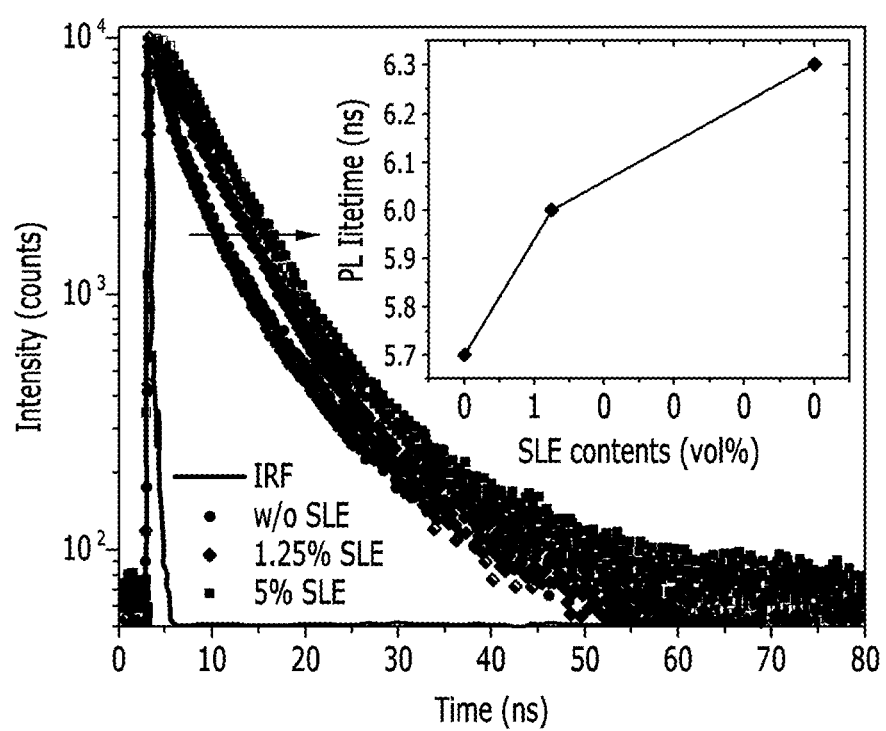

[Figure 4]

[Figure 5a]
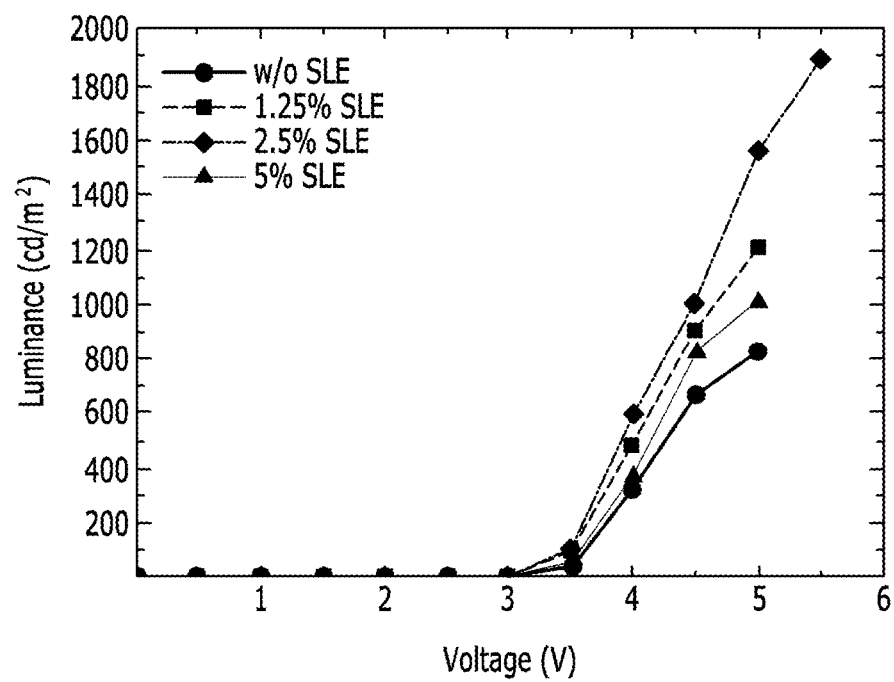

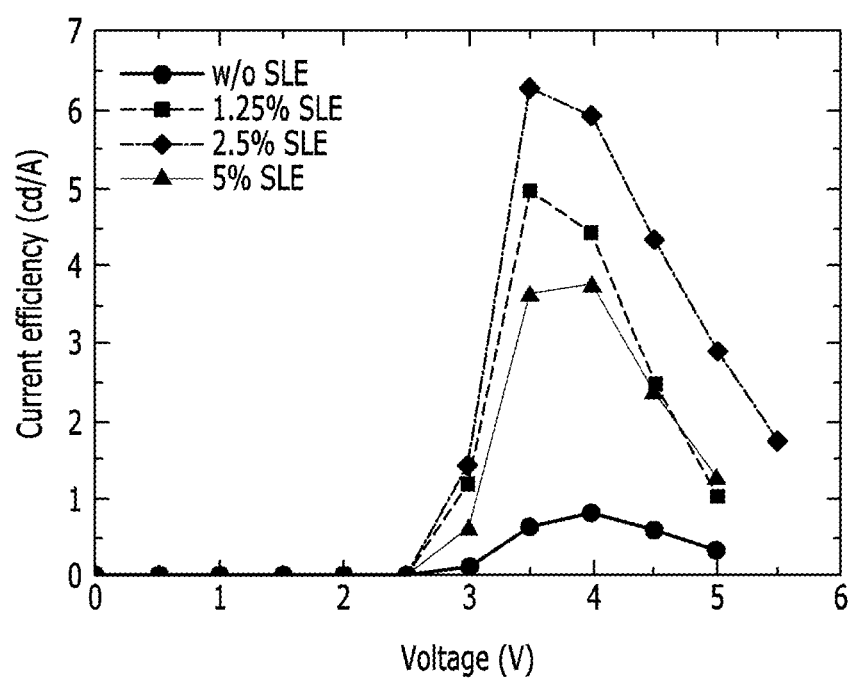
【Figure 5b】

【Figure 5c】
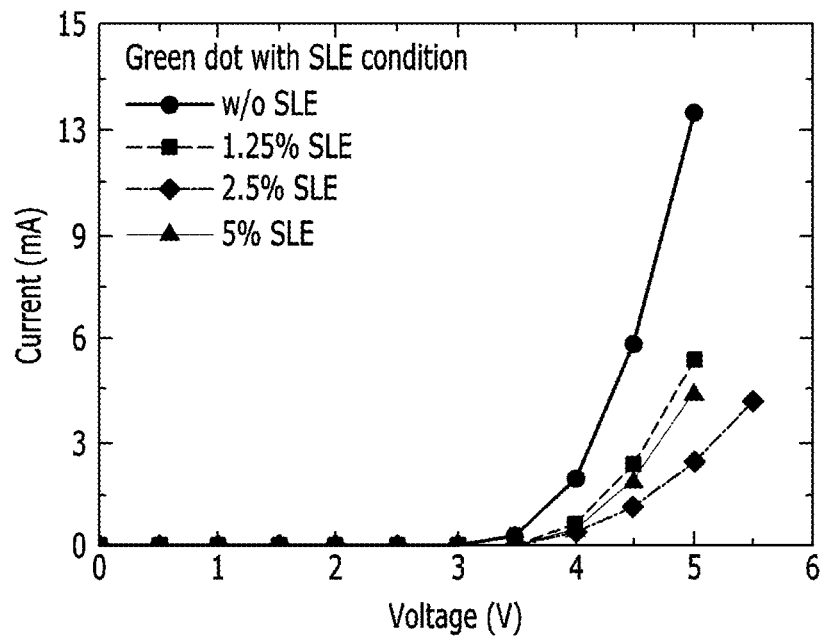
【Figure 5d】
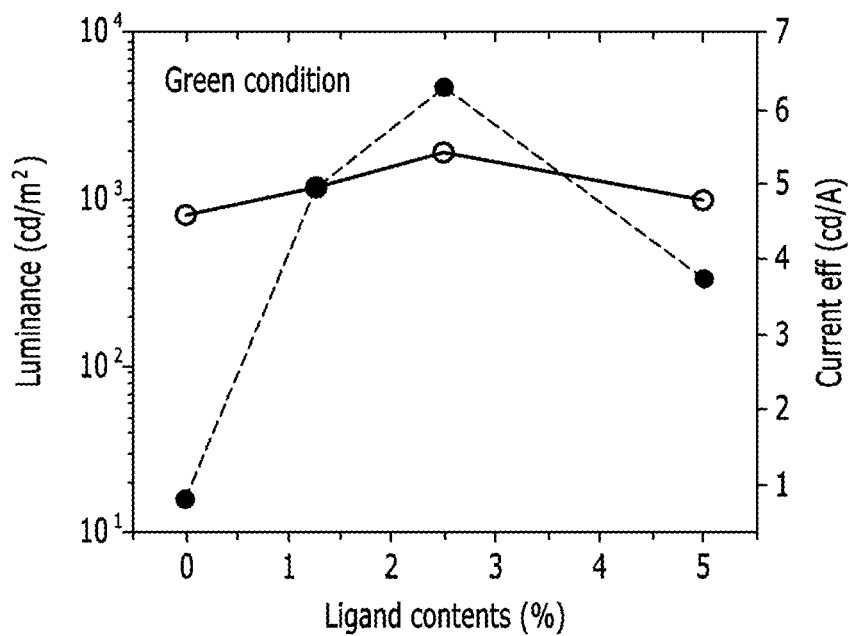

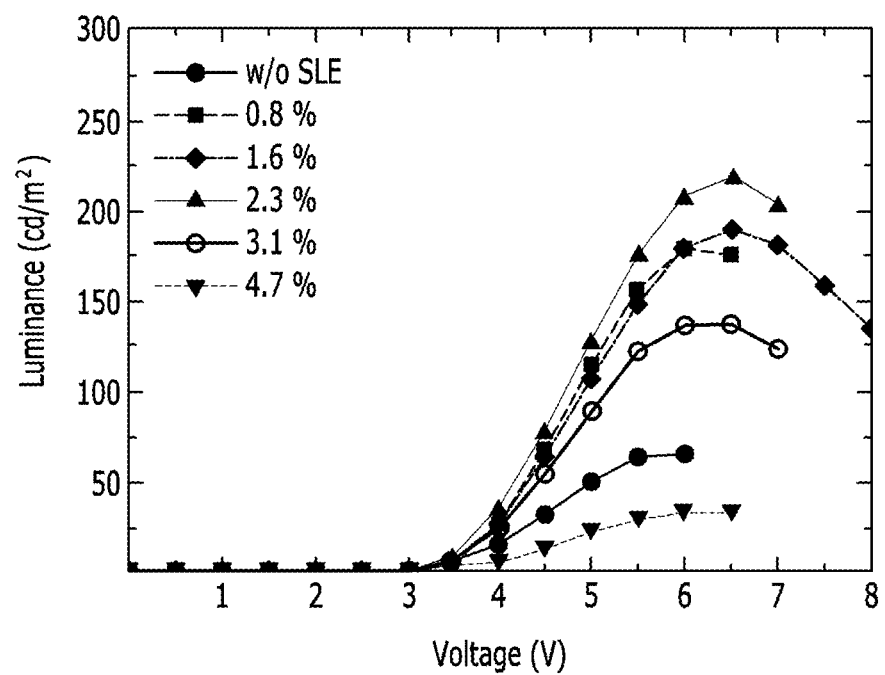
[Figure 6a]

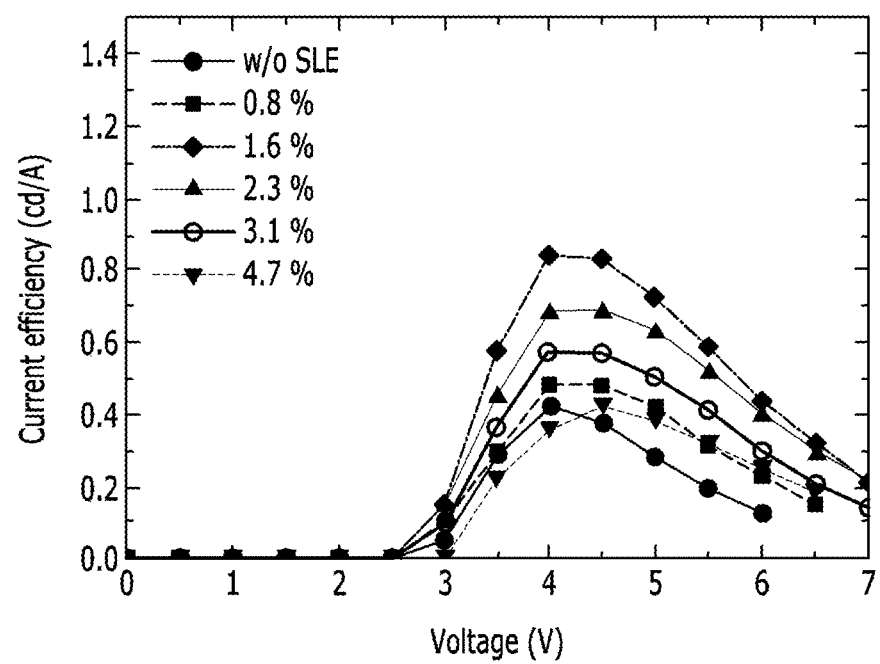
[Figure 6b]

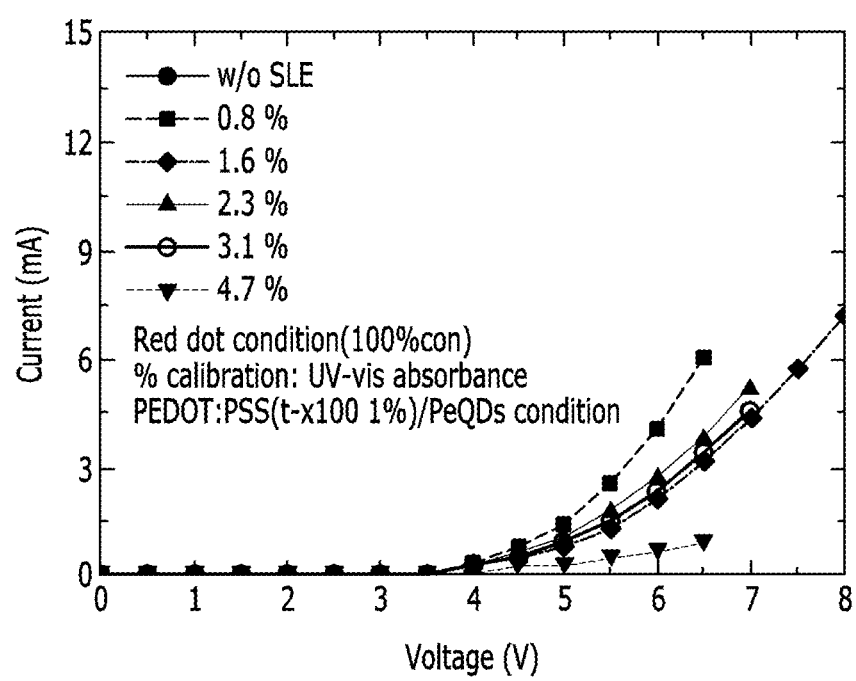
[Figure 6c]

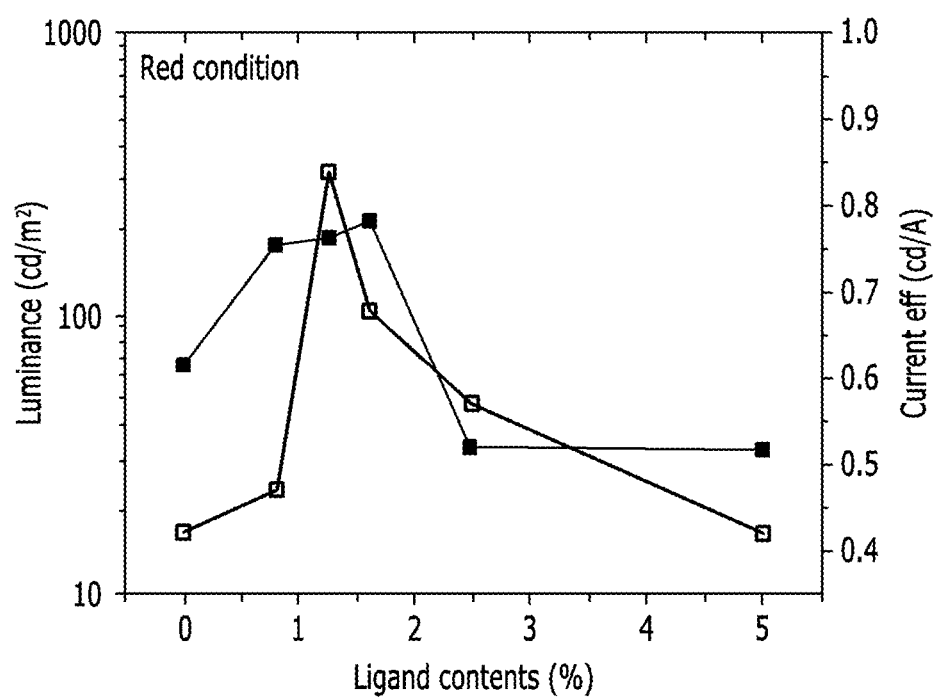
[Figure 6d]

[Figure 7a]
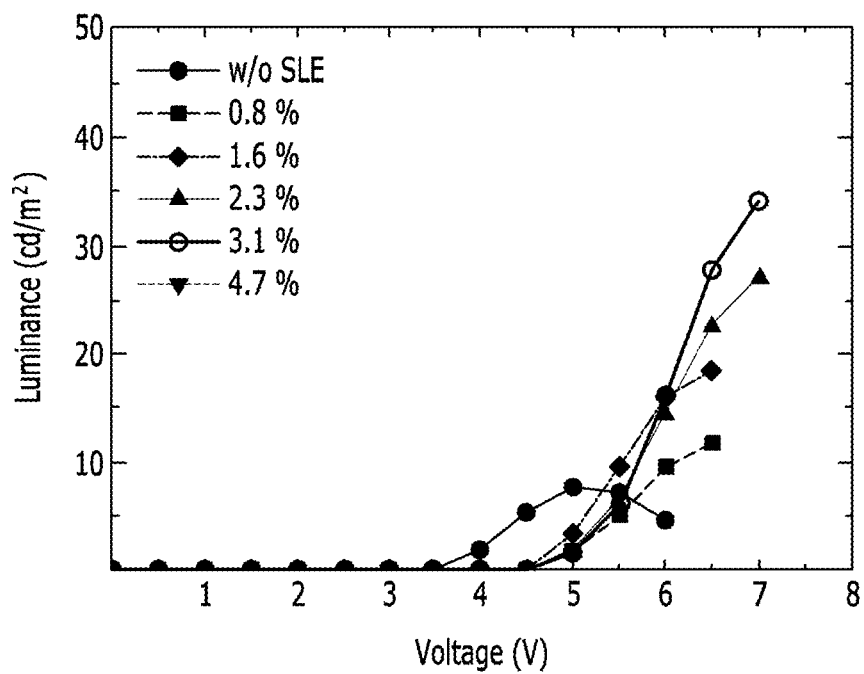
[Figure 7b]
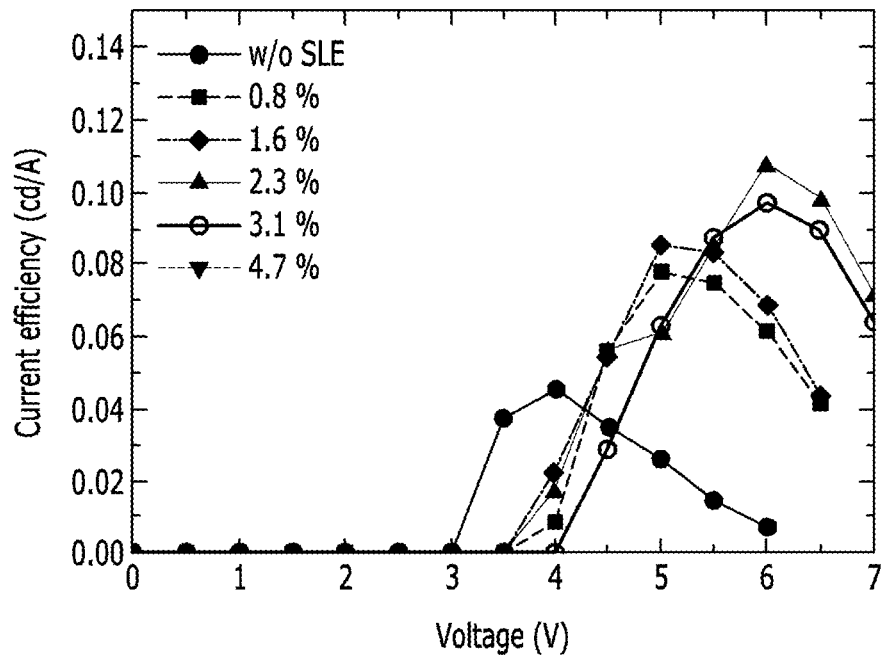

[Figure 7c]
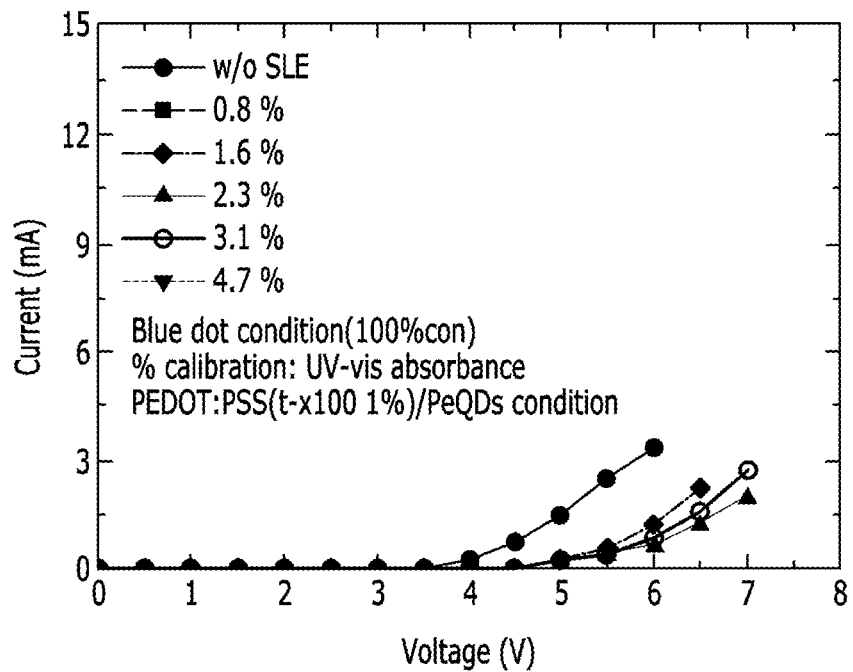
[Figure 7d]
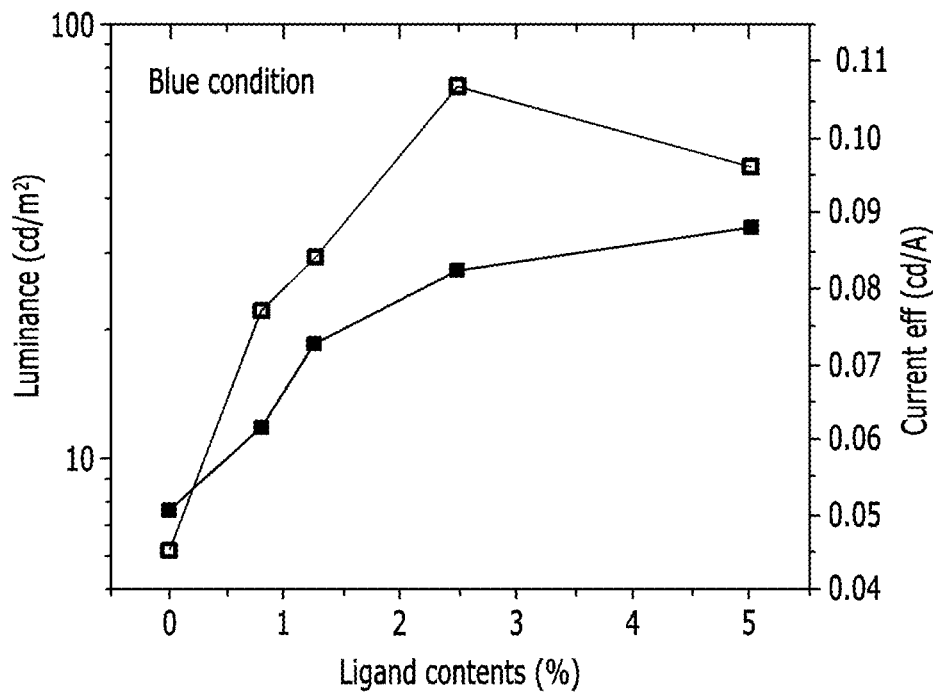

SURFACE-PASSIVATED QUANTUM DOTS AND METHOD FOR PASSIVATING SURFACE OF QUANTUM DOTS

TECHNICAL FIELD

The present invention relates to a surface-passivated quantum dot and a method of passivating a surface of a quantum dot.

BACKGROUND ART

It is known that a material based on a perovskite structure has excellent optoelectronic properties such as being able to realize a narrow half width at half maximum (HWHM) while realizing various band gaps and a high photoluminescent quantum yield (PL-QY).

In this regard, research for applying the perovskite-based material to improve performance of an optoelectronic device such as a solar cell and an organic light emitting device has been continuously conducted.

Specifically, attempts have been made to apply the perovskite-based material to a photo-active layer of an organic light emitting device to implement a perovskite quantum dot light emitting device (PeQLED).

However, there is a limitation in that in the case of applying quantum dots having a perovskite structure (i.e., perovskite quantum dots (PeQDs)) to the photo-active layer as a single material, only single colored light is exhibited but it is difficult to exhibit multicolored light and implement a large area device through a solution process.

DISCLOSURE

Technical Problem

The present invention has been made in an effort to provide a quantum dot of which a surface is passivated with a short chain ligand, and a method of passivating a surface of a quantum dot using a ligand exchange reaction.

Technical Solution

An exemplary embodiment of the present invention provides a surface-passivated quantum dot. Specifically, the surface-passivated quantum dot may include a perovskite quantum dot (PeQD) containing a compound having a perovskite structure, the perovskite quantum dot (PeQD) being represented by the following Chemical Formula 1; and a surface treatment layer positioned on a surface of the quantum dot and including an organic ligand represented by the following Chemical Formula 2 and an organic ligand represented by the following Chemical Formula 3:

$ABX^1_3$      [Chemical Formula 1]

in Chemical Formula 1, A is one of $CH_3NH_3$, $NH_2CH=NH_2$, Cs, Rb, Ba, In, K and Tl, B is one element of Pb, Sn, Bi, Ag, Ge and Zr, and $X^1$ is one element of F, Cl, Br and I.

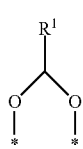
[Chemical Formula 2]

in Chemical Formula 2, $R^1$ is a substituted or unsubstituted C6-C20 aryl group, and moieties indicated by * are each bound to the surface of the quantum dot.

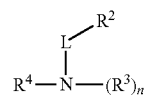
[Chemical Formula 3]

in Chemical Formula 3, L is any one of C1-C5 alkylene groups, $R^2$ to $R^4$ are each any one of hydrogen, deuterium, tritium, a substituted or unsubstituted C1-C6 alkyl group, and a substituted or unsubstituted C6-C20 aryl group, and n is 0 or 1.

Specifically, N of the organic ligand represented by Chemical Formula 3 may be bound to the surface of the quantum dot.

More specifically, the bond may be a coordinate bond between an unshared electron pair of N and the quantum dot.

Based on a total amount of the surface-passivated quantum dot, the quantum dot may be included in an amount of 1 to 50 wt %, the organic ligand represented by Chemical Formula 2 may be included in an amount of 1 to 50 wt %, and the organic ligand represented by Chemical Formula 3 may be the balance (0 wt % is exclusive).

A weight ratio of the organic ligand represented by Chemical Formula 3 to the organic ligand represented by Chemical Formula 2 (the organic ligand represented by Chemical Formula 3/the organic ligand represented by Chemical Formula 2) may be 99/1 to 1/99.

A diameter of the quantum dot may be 3 to 30 nm.

A thickness of the passivation layer may be 5 to 500 nm.

In the surface (100 sq %) of the quantum dot, the passivation layer may be distributed in a ratio of 1 to 100 sq %.

The passivation layer may be formed by a solid-state ligand exchange (SLE) reaction.

Another embodiment of the present invention provides a method of passivating a surface of a quantum dot, wherein a substrate is not used.

Specifically, the method of passivating the surface of the quantum dot may include: pretreating a surface of the quantum dot by mixing a pretreatment solution containing a fatty acid-based organic ligand, a fatty amine-based organic ligand, and a first organic solvent with a quantum dot represented by the following Chemical Formula 1; and inducing a ligand exchange reaction on the surface of the quantum dot by mixing a ligand exchange solution containing an organic ligand represented by $R^1$—COOH, an organic ligand represented by the following Chemical Formula 2, and a second organic solvent with the pretreated quantum dot.

More specifically, in the pretreating of the surface of the quantum dot, a pretreatment layer containing the fatty acid-based organic ligand and the fatty amine-based organic ligand may be formed on the surface of the quantum dot.

In addition, in the inducing of the ligand exchange reaction on the surface of the quantum dot, the pretreatment layer may be removed from the surface of the quantum dot, and at the same time, a final passivation layer including the organic ligand represented by the following Chemical Formula 2 and the organic ligand represented by the following Chemical Formula 3 may be formed:

$ABX^1_3$      [Chemical Formula 1]

in Chemical Formula 1, A is one of $CH_3NH_3$, $NH_2CH=NH_2$, Cs, Rb, Ba, In, K and Tl, B is one element of Pb, Sn, Bi, Ag, Ge and Zr, and $X^1$ is one element of F, Cl, Br and I.

[Chemical Formula 2]

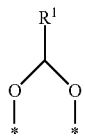

in the organic ligands represented by Chemical Formula 2 and $R^1$—COOH, $R^1$ is a substituted or unsubstituted C6-C20 aryl group, respectively.

In addition, the moieties indicated by * in Chemical Formula 2 are each bound to the surface of the quantum dot.

[Chemical Formula 3]

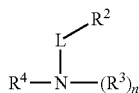

in Chemical Formula 3, L is any one of C1-C5 alkylene groups, $R^2$ to $R^4$ are each any one of hydrogen, deuterium, tritium, a substituted or unsubstituted C1-C6 alkyl group, and a substituted or unsubstituted C6-C20 aryl group, and n is 0 or 1.

The first organic solvent may be one or a mixture of two or more of benzene, toluene, chloroform, chlorobenzene, dichlorobenzene, ortho-xylene, meta-xylene, para-xylene, hexane, octane, heptane.

The method may further include, after the pretreating of the surface of the quantum dot, removing the first solvent to obtain the pretreated quantum dot in a solid state.

The second organic solvent may include a main solvent which is hexane, octane, heptane, or a combination thereof.

In addition, the second organic solvent may further include a sub-solvent which is benzene, toluene, xylene (o, m and p-xylene), or a combination thereof.

A volume ratio of the sub-solvent to the main solvent may be 1/99 to 99/1 (sub-solvent/main solvent).

In the inducing of the ligand exchange reaction on the surface of the quantum dot, 0.1 to 100 mg of the pretreated quantum dot may be mixed per 1 mL of the ligand exchange solution.

The method may further include, after the inducing of the ligand exchange reaction on the surface of the quantum dot, washing the quantum dot on which a final passivation layer is formed with the sub-solvent.

Another embodiment of the present invention provides a method of passivating a surface of a quantum dot, wherein a substrate is used.

Specifically, the method of passivating the surface of the quantum dot may include: pretreating a surface of the quantum dot by mixing a pretreatment solution containing a fatty acid-based organic ligand, a fatty amine-based organic ligand, and a first organic solvent with a quantum dot represented by the following Chemical Formula 1; coating the pretreated quantum dot on a substrate; and inducing a ligand exchange reaction on the surface of the quantum dot coated on the substrate by applying a ligand exchange solution containing an organic ligand represented by $R^1$—COOH, an organic ligand represented by the following Chemical Formula 2, and a second organic solvent on the substrate.

In the pretreating of the surface of the quantum dot, a pretreatment layer containing the fatty acid-based organic ligand and the fatty amine-based organic ligand may be formed on the surface of the quantum dot.

In addition, in the inducing of the ligand exchange reaction on the surface of the quantum dot coated on the substrate, the pretreatment layer may be removed from the surface of the quantum dot coated on the substrate, and at the same time, a final passivation layer including the organic ligand represented by the following Chemical Formula 2 and the organic ligand represented by the following Chemical Formula 3 may be formed:

$ABX^1_3$      [Chemical Formula 1]

in Chemical Formula 1, A is one of $CH_3NH_3$, $NH_2CH=NH_2$, Cs, Rb, Ba, In, K and Tl, B is one element of Pb, Sn, Bi, Ag, Ge and Zr, and $X^1$ is one element of F, Cl, Br and I.

In the organic ligands represented by Chemical Formula 2 and $R^1$—COOH, $R^1$ is a substituted or unsubstituted C6-C20 aryl group, respectively.

In addition, moieties indicated by * in Chemical Formula 2 are each bound to the surface of the quantum dot.

[Chemical Formula 3]

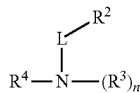

in Chemical Formula 3, L is any one of C1-C5 alkylene groups, $R^2$ to $R^4$ are each any one of hydrogen, deuterium, tritium, a substituted or unsubstituted C1-C6 alkyl group, and a substituted or unsubstituted C6-C20 aryl group, and n is 0 or 1.

The method may further include, before the coating of the pretreated quantum dot on the substrate, inducing a partial ligand exchange reaction on the surface of the pretreated quantum dot by mixing the pretreated quantum dot with the ligand exchange solution.

In the inducing of the partial ligand exchange reaction on the surface of the pretreated quantum dot, 0.5 vol % to 20 vol % of the ligand exchange solution may be mixed with 100 vol % of the pretreated quantum dot when absorbance of the pretreated quantum dot is 0.1.

In the inducing of the partial ligand exchange reaction on the surface of the pretreated quantum dot, the pretreatment layer may be partially removed from the surface of the quantum dot, and at the same time, an intermediate passivation layer in which the remaining pretreatment layer, the organic ligand represented by Chemical Formula 2, and the organic ligand represented by Chemical Formula 3 are mixed, may be formed.

As the substrate, a glass substrate using transparent conductors such as indium tin oxide (ITO) and fluorine-doped tin oxide (FTO), a polyimide substrate, and polyethylene terephthalate (PET) substrate may be used.

A description for other contents except for the above-described contents among the description for the embodiments of the present invention is as well known in the art.

Advantageous Effect

According to the embodiments of the present invention, the surface is passivated with a short chain ligand, such that the surface passivation ratio of the photo-active layer may be high, and accordingly, a photoemission property may be excellently exhibited.

DESCRIPTION OF THE DRAWINGS

FIG. 1 is views schematically illustrating a surface-passivated quantum dot according to an embodiment of the present invention and a method of passivating a surface of a quantum dot according to another embodiment of the present invention.

FIGS. 2a, 2b, 2c, 2d, and 2e illustrate evaluation results according to Evaluation Example 1 of the present invention.

FIGS. 3a, 3b, 3c, and 3d illustrate evaluation results according to Evaluation Example 2 of the present invention.

FIG. 4 illustrates an evaluation result according to Evaluation Example 3 of the present invention (scale bar: 100 μm).

FIGS. 5a, 5b, 5c, and 5d illustrate evaluation results according to Evaluation Example 4 of the present invention.

FIGS. 6a, 6b, 6c, and 6d illustrate evaluation results according to Evaluation Example 5 of the present invention.

FIGS. 7a, 7b, 7c, and 7d illustrate evaluation results according to Evaluation Example 6 of the present invention.

BEST MODE FOR INVENTION

Hereinafter, an exemplary embodiment of the present invention will be described in detail. However, it is to be understood that this exemplary embodiment is provided as an example, and the present invention is not limited by this exemplary embodiment, but is defined by only the scope of claims to be described below.

Definition of "Substitution" as Used Herein

The term "substitution" as used herein means that at least one hydrogen in a substituent or a compound is substituted with deuterium, a halogen group, a hydroxyl group, an amino group, a substituted or unsubstituted C1-C30 amine group, a nitro group, a substituted or unsubstituted C1-C40 silyl group, a C1-C30 alkyl group, a C1-C10 alkylsilyl group, a C3-C30 cycloalkyl group, a C6-C30 aryl group, and a C1-C20 alkoxy group, a fluoro group, a C1-C10 trifluoroalkyl group such as a trifluoromethyl group, or a cyano group, unless otherwise defined.

In addition, two adjacent substituents of the substituted halogen group, the hydroxyl group, the amino group, a substituted or unsubstituted C1-C20 amine group, the nitro group, a substituted or unsubstituted C3-C40 silyl group, the C1-C30 alkyl group, the C1-C10 alkylsilyl group, the C3-C30 cycloalkyl group, the C6-C30 aryl group, the C1-C20 alkoxy group, the fluoro group, the C1-C10 trifluoroalkyl group such as the trifluoromethyl group, or the cyano group may be fused to form a ring. Specifically, the substituted C6-C30 aryl group may be fused with other substituted C6-C30 aryl group adjacent thereto to form a substituted or unsubstituted fluorene ring.

The term "hetero" as used herein means a functional group containing 1 to 3 hetero atom(s) selected from the group consisting of N, O, S, and P, the remainder being carbon, unless otherwise defined.

The term "combination thereof" as used herein means that two or more substituents are linked with each other by a linker or two or more substituents are condensed to each other to thereby be linked with each other, unless otherwise defined.

The term "alkyl group" as used herein means an aliphatic hydrocarbon group, unless otherwise defined. The alkyl group may be a "saturated alkyl group" that does not include a double bond or a triple bond.

The alkyl group may be a C1-C20 alkyl group. More specifically, the alkyl group may be a C1-C10 alkyl group or a C1-C6 alkyl group. For example, a C1-C4 alkyl group means an alkyl chain containing 1 to 4 carbon atoms and is selected from the group consisting of methyl, ethyl, propyl, isopropyl, n-butyl, isobutyl, sec-butyl, and t-butyl.

Specific examples of the alkyl group include a methyl group, an ethyl group, a propyl group, an isopropyl group, a butyl group, an isobutyl group, a t-butyl group, a pentyl group, a hexyl group, a cyclopropyl group, a cyclobutyl group, a cyclopentyl group, a cyclohexyl group, or the like.

The term "aryl group" as used herein means a cyclic substituent of which all elements have a p-orbital and in which these p-orbitals form conjugation, and includes a monocyclic or fused-ring polycyclic functional group (i.e., rings which share adjacent pairs of carbon atoms).

The term "heteroaryl group" as used herein means an aryl group containing 1 to 3 hetero atom(s) selected from the group consisting of N, O, S, and P, the remainder being carbon. When the heteroaryl group is a fused ring, each ring may contain 1 to 3 hetero atom(s).

More specifically, examples of a substituted or unsubstituted C6-C30 aryl group, and/or a substituted or unsubstituted C2-C30 heteroaryl group may be, but are not limited to, a substituted or unsubstituted phenyl group, a substituted or unsubstituted naphthyl group, a substituted or unsubstituted anthracenyl group, a substituted or unsubstituted phenanthryl group, a substituted or unsubstituted naphthacenyl group, a substituted or unsubstituted pyrenyl group, a substituted or unsubstituted biphenylyl group, a substituted or unsubstituted p-terphenyl group, a substituted or unsubstituted m-terphenyl group, a substituted or unsubstituted chrysenyl group, a substituted or unsubstituted triphenylenyl group, a substituted or unsubstituted perylenyl group, a substituted or unsubstituted indenyl group, a substituted or unsubstituted furanyl group, a substituted or unsubstituted thiophenyl group, a substituted or unsubstituted pyrrolyl group, a substituted or unsubstituted pyrazolyl group, a substituted or unsubstituted imidazolyl group, a substituted or unsubstituted triazolyl group, a substituted or unsubstituted oxazolyl group, a substituted or unsubstituted thiazolyl group, a substituted or unsubstituted oxadiazolyl group, a substituted or unsubstituted thiadiazolyl group, a substituted or unsubstituted pyridyl group, a substituted or unsubstituted pyrimidinyl group, a substituted or unsubstituted pyrazinyl group, a substituted or unsubstituted triazinyl group, a substituted or unsubstituted benzofuranyl group, a substituted or unsubstituted benzothiophenyl group, a substituted or unsubstituted benzimidazolyl group, a substituted or unsubstituted indolyl group, a substituted or unsubstituted quinolinyl group, a substituted or unsubstituted isoquinolinyl group, a substituted or unsubstituted quinazolinyl group, a substituted or unsubstituted quinoxalinyl group, a substituted or unsubstituted naphthyridinyl group, a substituted or unsubstituted benzoxazinyl group, a substituted or unsubstituted benzthiazinyl group, a substituted or unsubstituted acridinyl group, a substituted or unsubstituted phenazinyl group, a substituted or unsubstituted phenothiazinyl group, a substituted or unsubstituted phenoxazinyl group, or a combination thereof.

Definition of "Bond" as Used Herein

The term "bond" as used herein, is a concept including an intermolecular bond and an interatomic bond, unless otherwise defined. Specifically, the term "bond" means a broad concept including van der Waals forces, a covalent bond, an ionic bond, a coordinate bond, or the like.

EXEMPLARY EMBODIMENTS OF THE PRESENT INVENTION

As described above, attempts have recently been made to apply a perovskite based material to a photo-active layer of an organic light emitting device to implement perovskite quantum dot light emitting device (PeQLED).

However, there is a limitation in that in the case of applying quantum dots having a perovskite structure (i.e., perovskite quantum dots, hereinafter, referred to as "PeQDs") to the photo-active layer as a single material, only single colored light is exhibited but it is difficult to exhibit multicolored light and implement a large area device through a solution process. Therefore, a method for changing properties of PeQDs has been required.

In view of this requirement, technologies of forming a passivation film on surfaces of PeQDs using a short chain organic ligand to change the properties of PeQDs have been suggested in exemplary embodiments of the present invention.

Specifically, technologies of controlling a ligand passivating the surfaces of PeQDs (hereinafter, referred to as a "surface passivation ligand") to optimize optical properties thereof and using a short chain ligand exchange method as the control method have been suggested in the exemplary embodiments of the present invention.

Surface-Passivated PeQDs with Short Chain Ligands

First, an exemplary embodiment of the present invention provides surface-passivated PeQDs with short chain ligands satisfying specific Chemical Formulas.

Specifically, in an exemplary embodiment of the present invention, the surface-passivated quantum dot includes a quantum dot represented by the following Chemical Formula 1; and a surface treatment layer positioned on a surface of the quantum dot and including an organic ligand represented by the following Chemical Formula 2 and an organic ligand represented by the following Chemical Formula 3:

$$ABX^1_3 \quad \text{[Chemical Formula 1]}$$

in Chemical Formula 1, A is one of $CH_3NH_3$, $NH_2CH=NH_2$, Cs, Rb, Ba, In, K, and Tl, B is one element of Pb, Sn, Bi, Ag, Ge, and Zr, and $X^1$ is one element of F, Cl, Br, and I.

[Chemical Formula 2]

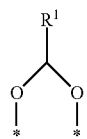

in Chemical Formula 2, $R^1$ is a substituted or unsubstituted C6-C20 aryl group, and moieties indicated by * are each bound to the surface of the quantum dot.

[Chemical Formula 3]

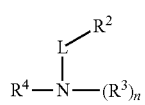

in Chemical Formula 3, L is any one of C1-C5 alkylene groups, $R^2$ to $R^4$ are each one of hydrogen, deuterium, tritium, a substituted or unsubstituted C1-C6 alkyl group, and a substituted or unsubstituted C6-C20 aryl group, and n is 0 or 1.

Selection Basis of Surface Passivation Ligand

In the surface-passivated quantum dot, in order to maximize a surface passivation ratio of PeQDs to suppress a surface defect, a chain length of a ligand binding to the surfaces of PeQDs (that is, a surface binding ligand) is decreased.

Specifically, long chain organic ligands (for example, C15 or more) such as oleic acid and oleamine are known to have a rapid diffuse out rate from surfaces of PeQDs in a solution state.

Therefore, in PeQDs passivated with a long chain organic ligand, the long chain organic ligand is rapidly diffused out in the solution state, such that a surface defect site may be increased, and a photoemission property may be deteriorated.

In order to suppress the above-mentioned phenomenon, studies have been known to decrease a ligand diffusion rate by excessively adding the long chain organic ligand to a PeQDs solution and improve a photoluminescence (PL) property.

However, since a residual ligand after excessive addition serves as a kind of insulating factor, excessive addition of the ligand is not an essential solution.

Meanwhile, a short chain ligand (e.g., C10 or less) is a ligand that is not dissolved in a solvent of the PeQDs solution and has a low diffusion rate. In PeQDs passivated with the short chain ligand as described above, coupling may be enable due to a narrow particle to particle distance, and thus, electronic properties may be improved.

However, it is difficult to form conditions for passivating the surfaces of PeQDs with the short chain ligand as described above, such that related research is insufficient up to now.

More specifically, since an alkyl-based short chain ligand has a low boiling point, thermal evaporation easily occurs under a vacuum condition, and thus, it is hard for the alkyl-based short chain ligand to be directly introduced into the surfaces of PeQDs.

Therefore, in the case of directly introducing the alkyl-based short chain ligand into the surfaces of PeQDs, a surface passivation ratio by the alkyl-based short chain ligand is low, and photoemission property is not satisfactory.

Therefore, there is a need to introduce a ligand having conditions that rigidity and a boiling point are high and a length of a molecule is short, and respective organic ligands represented by Chemical Formulas 2 and 3 satisfy these conditions.

Specifically, the organic ligand represented by Chemical Formula 2 is derived from $R^1$—COOH as described below. Since in $R^1$—COOH, $R^1$ is a substituted or unsubstituted C6-C20 aryl group, $R^1$ is an organic acid including a benzene ring. In this regard, due to the presence of the benzene ring in $R^1$—COOH, a length of the organic ligand is shorter that that of a liner alkyl chain ligand having the same number of carbon atoms. Therefore, $R^1$—COOH and the organic ligand derived from $R^1$—COOH and represented by Chemical Formula 2 have advantages in that they have relatively high boiling points while having relatively short ligand lengths, as compared to the linear alkyl chain ligand having the same number of carbon atoms.

Meanwhile, the organic ligand represented by Chemical Formula 3 may also be a C6-C20 aryl group in which among $R^2$ to $R^4$, at least one substituent is substituted or unsubstituted. In this case, the organic ligand has advantages in that it has a relatively high boiling point while having relatively short ligand lengths, as compared to the linear alkyl chain ligand having the same number of carbon atoms, due to the same principle described above.

Surface Passivation Type of PeQDs with Ligands Represented by Chemical Formulas 2 and 3

In the organic ligand represented by Chemical Formula 2, moieties indicated by * are each bound to the surface of the quantum dot. Specifically, in a process of passivating the surfaces of PeQDs using an organic ligand represented by $R^1$—COOH as a raw material, H is removed, the organic ligand represented by Chemical Formula 2 is formed, and thus, the moieties indicated by * are each bound to the surface of the quantum dot. A specific bond form may be a coordinated bond or an ionic bond.

Independently, in the case of the organic ligand represented by Chemical Formula 3, N may be bound to the surface of the quantum dot. Specifically, N of the organic ligand represented by Chemical Formula 3 may be bound to the surface of the quantum dot. More specifically, the bond may be a coordinate bond between an unshared electron pair of N and the quantum dot.

Meanwhile, based on a total amount of the surface-passivated quantum dot, the quantum dot may be included in an amount of 1 to 50 wt %, the organic ligand represented by Chemical Formula 2 may be included in an amount of 1 to 50 wt %, and the organic ligand represented by Chemical Formula 3 may be the balance (0 wt % is exclusive).

In addition, a weight ratio of the organic ligand represented by Chemical Formula 3 to the organic ligand represented by Chemical Formula 2 (the organic ligand represented by Chemical Formula 3/the organic ligand represented by Chemical Formula 2) may be 1/99 to 99/1.

In the case in which a content of each configuration in the total amount of the surface-passivated quantum dot and the weight ratio of the organic ligand represented by Chemical Formula 3 to the organic ligand represented by Chemical Formula 2 are satisfied, an effect by surface treatment may be appropriately exhibited.

Quantum Dot

The perovskite quantum dots (PeQDs) are not particularly limited as long as they satisfy the above-mentioned Chemical Formula 1.

For example, the perovskite quantum dots may be made of organometal halide perovskite such as methylammonium lead halide, formamidinium lead halide, methylammonium tin halide, and formamidinium tin halide.

In addition, the perovskite quantum dots may be made of all inorganic perovskite such as cesium lead halide, cesium tin halide, cesium silver halide, rubidium lead halide, rubidium tin halide, and rubidium silver halide.

Diameter of Quantum Dot, Thickness and Area Distribution of Passivation Layer

Regardless of Chemical Formula of PeQDs, a diameter thereof may be 3 to 30 nm. A thickness of the passivation layer may be 5 to 500 nm. When the diameter of the quantum dot and the thickness range of the surface treatment layer are satisfied, respectively, an effect of improving a photoluminescence property may be obtained. In addition, in the surface (100 sq %) of the quantum dot, the passivation layer may be distributed in a ratio of 1 to 100 sq %.

The passivation layer may be formed by a solid-state ligand exchange (SLE) reaction. Therefore, in the surface (100 sq %) of the quantum dot, the passivation layer may be distributed in a ratio of 10 to 100 sq %.

As an example of the ligand exchange reaction, the following two methods will be described.

Method of Passivating Surface of PeQDs with Short Chain Ligands

Chain lengths of the ligands of Chemical Formulas 2 and 3 are too long to be directly introduced into the surface of PeQDs, thereby increasing the internal resistance of the device. Therefore, in the embodiments of the present invention, two methods of passivating surface of PeQDs with a long chain ligand to form a pretreatment layer, and then removing the long chain ligand from the surfaces of PeQDs through a ligand exchange reaction and passivating the surfaces by a short chain ligand will be provided.

Specifically, in FIG. 1, parts (a), (b) and (c) are schematic views for describing exemplary embodiments of the present invention, and hereinafter, a detailed description will be provided with reference to FIG. 1.

Parts (a) and (b) of FIG. 1 relate to the case of not using a substrate, and part (c) of FIG. 1 relates to the case of using a substrate.

(1) Case of not Using Substrate

First, the method of passivating the surface of the quantum dot not using a substrate includes: pretreating a surface of the quantum dot by mixing a pretreatment solution containing a fatty acid-based organic ligand, a fatty amine-based organic ligand, and a first organic solvent with a perovskite quantum dot (PeQD) containing a compound having a perovskite structure, the perovskite quantum dot (PeQD) being represented by the following Chemical Formula 1; and inducing a ligand exchange reaction on the surface of the quantum dot by mixing a ligand exchange solution containing an organic ligand represented by $R^1$—COOH, an organic ligand represented by Chemical Formula 2, and a second organic solvent with the pretreated quantum dot.

More specifically, in the pretreating of the surface of the quantum dot, a pretreatment layer containing the fatty acid-based organic ligand and the fatty amine-based organic ligand is formed on the surface of the quantum dot.

In addition, in the inducing of the ligand exchange reaction on the surface of the quantum dot, the pretreatment layer is removed from the surface of the quantum dot, and at the same time, the final passivation layer containing the organic ligand represented by Chemical Formula 2 and the organic ligand represented by Chemical Formula 3 is formed.

Process of Forming Pretreatment Layer

Specifically, a process of forming the pretreatment layer on the surface of PeQDs is performed by a solution process using the fatty acid-based organic ligand and the fatty amine-based organic ligand as the long chain ligands and using a solvent (specifically, the first organic solvent).

Here, the fatty acid-based organic ligand may include one or a mixture of two or more of all fatty acid-based organic ligands known in the art. Examples thereof include oleic acid, stearic acid, or the like.

The fatty amine-based organic ligand may include one or a mixture of two or more of all fatty amine-based organic ligands known in the art. Examples thereof include oleylamine, dodecylamine, or the like.

In addition, as the first organic solvent, one or a mixture of two or more of hexane, toluene, benzene, octane, chloroform, chlorobenzene, dichlorobenzene, ortho-xylene, meta-xylene, and para-xylene may be used.

More specifically, the surfaces of PeQDs may be pretreated by mixing the fatty acid-based organic ligand and the fatty amine-based organic ligand with each other in the first organic solvent to prepare a pretreatment solution and mixing the pretreatment solution and PeQDs.

In this regard, the pretreatment solution having a total volume of 100 vol % may be prepared by allowing the fatty acid-based organic ligand and the fatty amine-based organic ligand to be contained therein in a total content of 0.00001 to 20 vol % and the first organic solvent to be the balance.

The pretreatment solution satisfying the above-mentioned composition may be suitable for forming a pretreatment layer having an appropriate thickness as compared to a diameter of the quantum dot and for being removal by a ligand exchange reaction to be described below. However, when the content is more than 20 vol %, there is a problem in that the thickness of the pretreatment layer becomes excessively thick and thus the quantum dot is decomposed, and when the content is less than 0.00001 vol %, there is a problem in that the thickness of the pretreatment layer becomes excessively thin.

Ligand Exchange Reaction

Thereafter, the ligand exchange reaction of the pretreated PeQDs may be performed under a liquid-state or solid-state condition. A condition of the ligand exchange reaction is distinguished depending on a state (liquid state) in which the pretreated PeQDs are dispersed in the first solvent and a state (solid state) in which the pretreated PeQDs are dried.

The pretreatment layer is removed from the surfaces of PeQDs and a final surface treatment layer is formed by applying the ligand exchange solution to the pretreated PeQDs regardless of the condition.

Here, the ligand exchange solution contains short chain ligands to be exchanged with the pretreatment layer and the solvent (second organic solvent).

Ligand Used in Ligand Exchange Reaction

Here, the short chain ligands exchanged with the pretreatment layer are the organic ligand represented by Chemical Formula 2 and the organic ligand represented by Chemical Formula 3 on the surfaces of PeQDs.

In this regard, the organic ligand represented by $R^1$—COOH may become the organic ligand represented by Chemical Formula 2 in the surface of PeQDs by removal of H in the second solvent. Therefore, the organic ligand represented by $R^1$—COOH is applied to the ligand exchanged solution.

Meanwhile, the organic ligand represented by Chemical Formula 3 is attached to the surfaces of PeQDs without a chemical change in the second solvent. Therefore, the organic ligand represented by Chemical Formula 3 is applied to the ligand exchange solution.

Solvent Used in Ligand Exchange Reaction

As described above, the long chain ligand has high solubility regardless of the kind of solvent, and thus, the long chain ligand is easily diffused out from the surfaces of PeQDs. Therefore, in order to remove the pretreatment layer, any solvent may be used as the second solvent.

However, in an exemplary embodiment of the present invention, a solvent having low solubility for the short chain ligands exchanged with the pretreatment layer is selected as a main solvent, such that the long chain ligand is diffused out from the surfaces of PeQDs, and the short chain ligands are passivated on the surfaces of PeQDs. Of course, the main solvent should have a good dispersion property with respect to PeQDs. For example, the main solvent may be hexane, octane, heptane, or a combination thereof.

Here, only the main solvent may be used as the second solvent, but solubility of the short chain ligands may be increased by using a sub-solvent in addition to the main solvent. For example, the sub-solvent may be benzene, toluene, xylene (o-, m-, and p-xylene), or a combination thereof.

When using both the main solvent and the sub-solvent as the second solvents, there is a need to control a volume ratio of the sub-solvent to the main solvent to be 1/99 to 99/1. When the volume ratio satisfies this range, a control of a diffusion rate by the main solvent and a control of solubility by the sub-solvent with respect to the short chain ligands may be appropriately balanced.

However, when the volume ratio exceeds the above-mentioned range and thus, the sub-solvent is excessively contained, a content of the main solvent is rather decreased, such that the diffusion rate of the short chain ligands is increased, and thus, a surface defect may be increased in the finally passivated PeQDs.

Even though the content of the sub-solvent is less than the above-mentioned range to thereby be small, there is no problem, but an effect by the sub-solvent may be insufficient.

Content of Each Material in Ligand Exchange Reaction Solution

In the ligand exchange solution, a volume ratio of the organic ligand represented by Chemical Formula 3 to the organic ligand represented by $R^1$—COOH (the organic ligand represented by Chemical Formula 3/the organic ligand represented by Chemical Formula 2) may be 1/99 to 99/1.

The reason is that the organic ligand represented by $R^1$—COOH and the organic ligand represented by Chemical Formula 3 becomes ligands finally passivating the surfaces of PeQDs, and thus, a composition of the final surface treatment layer is considered.

Meanwhile, the pretreatment solution having a total volume of 100 vol % may be prepared by allowing the organic ligand represented by $R^1$—COOH and the organic ligand represented by Chemical Formula 3 to be contained therein in a total content of 0.00001 to 20 vol % and the second organic solvent to be the balance.

The ligand exchange solution may be suitable for forming the final passivation layer at a suitable thickness as compared to the diameter of the quantum dot while removing the pretreatment layer from the surfaces of the pretreated PeQDs. However, when the content is more than 20 vol %, there is a problem in that the thickness of the final passivation layer becomes excessively thick and thus the quantum dot is decomposed, and when the content is less than 0.00001 vol %, there is a problem in that the thickness of the final passivation layer becomes excessively thin.

Application Amount of Ligand Exchange Solution 0.1 to 100 mg of the pretreated quantum dot may be mixed based on 1 mL of the ligand exchange solution.

When this is satisfied, it is possible to form the pretreatment layer having a suitable thickness as compared to the diameter of the quantum dot. However, when the amount of the quantum dot exceeds 100 mg, a dispersion property of each material in the solution may be decreased, and when the amount of the quantum dot is less than 0.1 mg, decomposition of the quantum dot may easily occur.

However, when the ligand exchange reaction is carried out under the liquid-state condition, after the reaction proceeds to some extent, a colloidal property of the reaction solution may be lost, and precipitation of PeQDs may occur. This phenomenon is caused by a short chain length of the ligands used in the ligand exchange reaction.

Therefore, in the case in which the ligand exchange reaction is carried out under the liquid-state condition, there is a need to sensitively control a process condition thereof.

(2) Case of Using Substrate

Meanwhile, in the case of the solid-state ligand exchange reaction (in which ligand exchange reaction proceeds under a solid-state condition), a process control may be easy.

Specifically, after coating the pretreated PeQDs on the substrate (solid-state), the ligand exchange solution may be applied on the substrate coated with the pretreated PeQDs. In this case, the ligand exchange reaction is induced on the surfaces of the PeQDs coated on the substrate, and a passivation ratio by the short chain ligand may be further improved.

In this regard, in Evaluation Example to be described below, it was confirmed that the quantum dot of which the surface was passivated with the short chain ligand was manufactured by performing the ligand exchange reaction on the substrate and at the same time, a thin film including the quantum dot of which the surface was passivated was uniformly formed to have a desired thickness. This means that a quantum dot light emitting diode having excellent performance may be implemented by forming a quantum dot layer having a desired thin film thickness within 10 layers on an arbitrary substrate, and achieving uniform surface quality almost without a defect.

More specifically, the method of passivating the surface of the quantum dot layer on the substrate may include: pretreating a surface of the quantum dot by mixing a pretreatment solution containing a fatty acid-based organic ligand, a fatty amine-based organic ligand, and a first organic solvent with a perovskite quantum dot (PeQD) containing a compound having a perovskite structure, the perovskite structure being represented by the Chemical Formula 1; coating the pretreated quantum dot on the substrate; and inducing a ligand exchange reaction on the surface of the quantum dot coated on the substrate by applying a ligand exchange solution containing an organic ligand represented by $R^1$—COOH, an organic ligand represented by Chemical Formula 2, and a second organic solvent on the substrate.

In the pretreating of the surface of the quantum dot, a pretreatment layer containing the fatty acid-based organic ligand and the fatty amine-based organic ligand is formed on the surface of the quantum dot.

In addition, in the inducing of the ligand exchange reaction on the surface of the quantum dot coated on the substrate, the pretreatment layer is removed from the surface of the quantum dot coated on the substrate, and at the same time, a final passivation layer including the organic ligand represented by Chemical Formula 2 and the organic ligand represented by Chemical Formula 3 is formed.

The substrate may be a substrate formed of glass using transparent conductors such as ITO and FTO, polyimide, and PET. A substrate coated with another material may also be used.

Process of Forming Pretreatment Layer

Even in performing the ligand exchange reaction on the substrate, a method of pretreating PeQDs is the same as that in case of not using the substrate. Since contents thereof are the same as described above, a detailed description thereof will be omitted.

Process of Coating Pretreated PeQDs on Substrate

A method of applying the pretreated PeQDs on the substrate may be a spin coating method, a dip coating method, or the like. Of course, since this coating method is a kind of solution method, the ligand exchange solution needs to be applied in a dried state (solid-state) after removing a solvent used in the coating.

For example, a solution for spin coating may be a solution in which the pretreated PeQDs are dispersed using the second organic solvent as a solvent.

Specifically, a solution obtained by dispersing the pretreated PeQDs so as to have a concentration of 0.1 to 100 mg per 1 mL of the second organic solvent may be spin-coated on the substrate.

Partial Ligand Exchange Reaction of Pretreated PeQDs

Meanwhile, in the case of applying the ligand exchange solution on the substrate coated with the pretreated PeQDs, the pretreated PeQDs themselves may be washed out from the substrate by the ligand exchange solution. This is caused by the long chain ligand positioned on the surfaces of the pretreated PeQDs.

Therefore, an intermediate passivation layer may be formed by reacting the pretreated PeQDs and the ligand exchange solution with each other to partially remove the long chain ligand and partially passivate the short chain ligand on the surface of the PeQDs, before coating the pretreated PeQDs on the substrate.

Here, 0.5 vol % to 20 vol % of the ligand exchange solution may be mixed with 100 vol % of the pretreated quantum dot when absorbance of the pretreated quantum dot is 0.1. In the case of coating the PeQDs on which the intermediate passivation layer is formed on the substrate and applying the ligand exchange solution on the surface of the substrate, a passivation ratio by the short chain ligand in a finally obtained passivation layer may be more excellent.

Final Ligand Exchange Reaction

Regardless of the liquid-state or solid-state condition, whether or not the process of forming the intermediate passivation layer is included, or the like, a final ligand exchange reaction is carried out on the substrate.

In detail, the above-mentioned ligand exchange solution may be applied on the substrate coated with the pretreated PeQDs or PeQDs in which the partial ligand exchange reaction is carried out.

Therefore, the pretreatment layer is removed form the surface of the quantum dot coated on the substrate, and at the same time, the final passivation layer containing the organic ligand represented by the following Chemical Formula 2 and the organic ligand represented by the following Chemical 3 may be formed.

A method of applying the ligand exchange solution on the substrate may be a spin coating method, a dip coating method, or the like, but is not limited thereto.

Meanwhile, a description of configuration materials of the ligand exchange solution and contents thereof is the same as described above.

Process of Removing Residual Ligand

The method may further include a process of removing a residual ligand after forming the final passivation layer.

The above-mentioned sub-solvent may be used as a washing solution removing the residual ligand. In the case of forming the final passivation layer on the substrate, a method of applying and spin-coating the washing solution on the substrate may be used.

MODE FOR INVENTION

Hereinafter, specific examples of the present invention will be described. However, Examples to be described below are provided in order to specifically exemplify or describe the present invention, and the present invention is not limited thereto.

I. Evaluation of Physical Properties of PeQDs

Example 1 (Passivation of Surfaces of PeQDs)

(1) Pretreatment Process

As PeQDs, PeQDs represented by Chemical Formula $CsPbX_3$ (X=Cl, I and Br) and having a particle diameter of 9 nm were used.

In addition, oleic acid was used as a fatty acid-based organic ligand, oleylamine was used as a fatty amine-based organic ligand, and hexane was used as a first organic solvent, such that a pretreatment solution was prepared.

The fatty acid-based organic ligand and the fatty amine-based organic ligand were contained at a content of 2.5 vol % based on a total volume (100 vol %) of the pretreatment solution, and the first organic solvent was contained as the balance. In addition, a volume ratio of the fatty acid-based organic ligand and the fatty amine-based organic ligand in the pretreatment solution was 1:1.

40 mg of PeQDs was injected per 1 mL of the pretreatment solution, thereby forming a pretreatment layer on surfaces of PeQDs. The pretreatment layer contained the fatty acid based organic ligand and the fatty amine-based organic ligand.

(2) Preparation of Ligand Exchange Solution

As an organic ligand represented by $R^1$—COOH, benzoic acid ($C_6H_5COOH$) was used, and as an organic ligand represented by the above-mentioned Chemical Formula 3, an amine-based ligand represented by Chemical Formula $C_6H_5CH_2CH_2CH_2CH_2NH_2$ was used, and as a second organic solvent, a solvent in which benzene and octane was mixed with each other at a volume ratio of 1/9 was used, such that two ligand exchange solutions were prepared as follows.

1) Based on a total volume (100 vol %) of the ligand exchange solution, the organic ligand represented by $R^1$—COOH and the organic ligand represented by Chemical Formula 3 were contained at a total content of 1.25 vol %, and the second organic solvent was contained as the balance. In addition, a volume ratio of the organic ligand represented by $R^1$—COOH and the organic ligand represented by Chemical Formula 3 was 1:1.

2) Based on a total volume (100 vol %) of the ligand exchange solution, the organic ligand represented by $R^1$—COOH and the organic ligand represented by Chemical Formula 3 were contained at a total content of 5 vol %, and the second organic solvent was contained as the balance. In addition, a volume ratio of the organic ligand represented by $R^1$—COOH and the organic ligand represented by Chemical Formula 3 was 1:1.

(3) Partial Ligand Exchange Reaction

These two ligand exchange solutions were each reacted with the pretreated PeQDs.

Specifically, 40 mg of the pretreated PeQDs were added per 1 mL of the ligand exchange solution. Therefore, long chain ligands were partially removed from the surfaces of PeQDs, and short chain ligands were partially passivated, such that an intermediate passivation layer was formed.

(4) Final Ligand Exchange Reaction

A substrate made of a glass material coated with ITO and having a total thickness of 1.0 T was used, and a final ligand exchange process was performed on the substrate.

To this end, a coating solution was prepared by dispersing 40 mg of PeQDs on which the intermediate passivation layer was formed per 1 mL of the second solvent.

40 uL of the coating solution was taken, spin-coated on the substrate, and dried, thereby forming a thin film having a thickness of 40 nm.

50 uL of each of the two ligand exchange solutions was applied on the thin film formed on the substrate by a spin-coating method. Accordingly, a final ligand exchange reaction was carried out.

Therefore, a substrate on which the thin film including PeQDs having a final passivation layer formed thereon was formed, was obtained.

(5) Process of Removing Residual Ligands

A washing process was performed by applying and spin-coating benzene on the substrate subjected to the final ligand exchange process.

Therefore, PeQDs on which the final passivation layer was formed was obtained on the substrate.

Comparative Example 1 (PeQDs on which Pretreatment Layer was Formed)

PeQDs on which a pretreatment layer was formed were obtained by performing a washing process after a pretreatment process in Example 1.

Evaluation Example 1

Shape and surface properties depending on the presence or absence of surface treatment of PeQDs were evaluated.

(1) Transmission Electron Microscope (TEM) Image

FIG. 2a is a transmission electron microscope (TEM) image in Comparative Example 1, and FIG. 2b and FIG. 2c are TEM images in Example 1, and states of each surface may be confirmed.

Specifically, it may be confirmed that components of a surface in Comparative Example 1 were oleic acid and oleylamine, components of a surface passivated with 1.25 vol % of the ligand exchange solution in Example 1 were benzoic acid and 4-phenylbutylamine, and components of a surface passivated with 5 vol % of the ligand exchange solution in Example 1 were benzoic acid and 4-phenylbutylamine.

(2) Fourier-Transform Infrared Spectroscopy (FT-IR) Analysis

Meanwhile, FIG. 2d and FIG. 2e illustrate FT-IR analysis results of PeQDs on which the pretreatment layer was formed, PeQDs on which the intermediate passivation layer was formed, and PeQDs on which the final passivation layer was formed, and a ligand positioned in each surface may be confirmed.

Specifically, FIG. 2d shows transmittance in a region of 1300 to 3200 $cm^{-1}$, and an entire peak shape and shift may be evaluated through FIG. 2d.

In FIG. 2d, the presence of the ligand having a long chain in PeQDs on which the pretreatment layer was formed may be confirmed from a peak in a region of 2840 to 2959 $cm^{-1}$. Further, it may be confirmed that in PeQDs on which intermediate passivation layer was formed, a peak in a region of 2840 to 2959 $cm^{-1}$ was decreased, and a peak at 1395 $cm^{-1}$ was formed.

Meanwhile, it may be confirmed that in PeQDs on which the final passivation layer (passivated with 5 vol % of the ligand exchange solution) was formed, a decrease of a peak in a region of 2840 to 2959 $cm^{-1}$ was increased, and an increase of a peak at 1395 $cm^{-1}$ was also increased, as compared to PeQDs on which the intermediate passivation layer was formed.

It may be appreciated through the above-mentioned results that a long chain ligand was substituted with a short chain ligand.

In addition, FIG. 2e shows transmittance in a region of 1300 to 1800 $cm^{-1}$, it may be confirmed that particularly, in PeQDs on which the final passivation layer was formed, a peak at 1395 $cm^{-1}$ was noticeable.

In PeQDs on which the pretreatment layer was formed, a peak at 1395 $cm^{-1}$ was minute, and in PeQDs on which the intermediate passivation layer was formed, the peak at 1395 $cm^{-1}$ was gradually exhibited.

A ligand exchange reaction may be proven through this peak at 1395 $cm^{-1}$.

Evaluation Example 2 (Evaluation of Photoluminescence Through Time-Correlated Single Photon Counting (TCSPC) Result)

In order to evaluate optical properties depending on ligand exchange, time correlated single photon counting (TCSPC) analysis was performed, and the results thereof were illustrated in FIGS. 3a to 3d.

(1) First, in FIG. 3a, as red, green, and blue PeQDs were used, relative photoluminescence (PL) intensities were confirmed.

Specifically, a quantum dot, which is a target of surface passivation, was differently selected depending on a luminescence color. In the case of a red color, a $CsPbI_3$ quantum dot was selected, in the case of a green color, a $CsPbBr_3$ quantum dot was selected, and in the case of a blue color, a $CsPbClBr_2$ quantum dot was selected, such that in each case, a pretreatment process, a partial passivation process, and a final passivation process were sequentially performed in the same manner as in Example 1.

However, a ligand content in each ligand exchange solution was variously set to 1 vol %, 1.25 vol %, 5 vol %, 10 vol %, and 15 vol %.

Separately, each pretreated quantum dot was obtained by performing the processes on the quantum dot depending on each luminescence color only up to the pretreatment process in Example 1.

As a result, in FIG. 3a, bandgaps of the quantum dots used in an experiment were confirmed through absorbance and luminescence analysis.

(2) Further, in FIG. 3b, differences depending on chain lengths and structures of the ligand were confirmed.

Specifically, as the quantum dot, the $CsPbBr_3$ quantum dot was selected. In addition, in an alkyl amine-based organic ligand or benzyl amine-based organic ligand as amine-based organic ligands among organic ligands for pretreatment, the number of carbon atoms configuring a chain of each organic ligand was variously set to 6, 8, 12, 16, 18, and the like. A mixture in which benzoic acid and each amine-based ligand were also mixed at a volume ratio of 1/1 (benzoic acid/amine-based ligand) was used as the organic ligand for pretreatment, and the processes on the quantum dot were performed only up to the pretreatment process in Example 1, and a resultant obtained by freeze-drying the pretreated quantum dot was used for analysis.

As a result, in FIG. 3b, photoluminescence performance depending on the number of carbon atoms of the ligand may be confirmed, and it may be confirmed that a maximum photoluminescence property was maintained at a minimum number of carbon atoms tested with respect to an aromatic ligand.

(3) In FIG. 3c, photoluminescence intensities depending on Chemical Formula of a quantum dot and a ligand content were compared with each other.

Specifically, a quantum dot, which was a surface passivation target, was differently selected depending on a luminescence color. In the case of a red color, a $CsPbI_3$ quantum dot was selected, in the case of a green color, a $CsPbBr_3$ quantum dot was selected, and in the case of a blue color, a $CsPbClBr_2$ quantum dot was selected, such that in each case, a pretreatment process, a partial passivation process, and a final passivation process were sequentially performed in the same manner as in Example 1.

However, a ligand content in each ligand exchange solution was variously set to 5 vol %, 10 vol %, and 15 vol %.

Separately, each pretreated quantum dot was obtained by performing the process on the quantum dot depending on each luminescence color only up to the pretreatment process in Example 1.

As a result, in FIG. 3c, it is possible to confirm a ligand ratio optimized through photoluminescence property analysis depending on a ligand ratio.

(4) In FIG. 3d, properties of the quantum do depending on a concentration of the ligand exchange solution were confirmed. Specifically, a surface defect control property by ligand treatment may be confirmed through PL decay lifetime analysis of two kinds of surface passivated PeQDs in Example 1 and PeQDs in Comparative Example 1.

Evaluation Example 3 (Evaluation of Substrate Coating Property)

Film fims including PeQDs on which a final passivation layer was formed was formed on two substrates, respectively, by the same process as in Example 1.

Specifically, two substrates were (substrate 1: material, thickness) and (substrate 2: material, thickness).

As a quantum dot, a $CsPbBr_3$ quantum dot was selected, and before coating each of the substrates after pretreating the quantum dot by the same process in Example 1, a partial ligand exchange reaction was carried out. Next, a thin film formed by a process of spin-coating a PeQDs solution in which ligands were partially exchanged on each substrate and removing the residual ligands was referred to as one layer (1 layer).

(1) Measurement of Thickness of Thin Film

While forming a thin film of 13 layers by repeated performing a thin film forming process on each substrate several times, total thicknesses of the thin film and the substrate were measured when the numbers of layers of the thin film were 3, 5, 7, 10, and 13, respectively.

The measurement results are shown in the following Table 1.

TABLE 1

|  | 3 layers | 5 layers | 7 layers | 10 layers | 13 layers |
| --- | --- | --- | --- | --- | --- |
| substrate 1 | 53 nm | 82 nm | 139 nm | 163 nm | 45 nm |
| substrate 2 | 55 nm | 85 nm | 135 nm | 174 nm | 142 nm |

Referring to Table 1, it may be confirmed that regardless of the kind and thickness of substrate, until the number of layers of the formed thin film was 10, the total thicknesses of the thin film and the substrate tended to constantly increased. Therefore, it may be confirmed that a thickness of each layer of the formed thin film was in a range of 12 to 30 nm.

However, when a thin film of more than 10 layers was formed, the total thickness of the thin film and the substrate started to decrease, such that there is a need to form the thin film within 10 layers.

Therefore, according to the exemplary embodiments of the present invention, it may be appreciated that a quantum dot of which a surface is passivated with a short chain ligand may be manufactured by performing a ligand exchange reaction on a substrate, and at the same time, a thin film including the quantum dot of which the surface is passivated as described above may be formed to have a desired thickness. This means that a quantum dot having excellent performance may be implemented by forming a quantum dot layer to have a desired thin film thickness within 10 layers on an arbiturary substrate.

(2) Fluorescence Microscopy Image

Meanwhile, in Evaluation Example 3, a fluorescence microscopy image thereof was captured, and shown in FIG. 4.

Referring to FIG. 4, it was confirmed that a gray color (a green color is shown in the color image but is represented by a gray color in the black and white image) by $CsPbBr_3$ quantum dot as the quantum dot was uniformly exhibited on a front surface.

Therefore, according to the embodiments of the present invention, it may be appreciated that a quantum dot of which a surface is passivated with a short chain ligand may be manufactured by performing a ligand exchange reaction on a substrate, and at the same time, a thin film including the quantum dot of which the surface is passivated as described above may be uniformly formed. This means that a high passivation ratio may be achieved by uniformly forming the quantum dot layer on an arbitrary substrate almost without a surface defect, and thus, a quantum dot light emitting diode having excellent performance may be implemented.

II. Evaluation of Performance of Organic Light Emitting Diode (OLED) to which PeQDs were Applied Example 2

An ITO substrate was used as a cathode, and an electron transport layer containing ZnO was formed on the cathode. Specifically, after spin-coating a ZnO sol-gel solution (0.33 g of Zn(acetate) was dissolved in a solvent in which 3 mL of 2-methoxyethanol and 1 mL of isopropanol were mixed with each other) on the cathode at 3000 rpm, heat treatment was performed thereon at 250° C. for 15 minutes.

A polymer electrolyte layer was formed by spin-coating 2 mg/mL of a PFN solution (solvent: MeOH) on the electron transport layer thus formed at 4000 rpm.

A quantum dot layer was formed on the polymer electrolyte layer using the method in Example 1. Specifically, a final ligand exchange reaction in Example 1 was carried out on the polymer electrolyte layer.

Here, as a quantum dot, which is a surface passivation target, a $CsPbBr_3$ quantum dot (green), a $CsPbI_3$ quantum dot (red), or a $CsPbClBr_2$ quantum dot (blue) was selected, and each quantum dot was pretreated by the same process as in Example 1 and then, partially passivated.

Furthermore, for each quantum dot, a concentration of a ligand exchange solution was variously set to 1.25 vol %, 2.5 vol %, and 5 vol %. A final ligand exchange reaction was carried out on the polymer electrolyte layer.

Thereafter, TAPC (60 nm), $MoO_3$ (10 nm), and Ag (100 nm) were sequentially deposited on the quantum dot layer using a thermal evaporator.

Finally, a quantum dot light emitting diode having an invert structure was obtained. Specifically, a structure thereof was ITO/ZnO(ETL)/PFN(polyelectrolyte)/PeQDs/TAPC(HTL)/$MoO_3$(HTL)/Ag.

Comparative Example 2

A quantum dot light emitting diode having an invert structure in which a quantum dot subjected up to a process of forming a pretreatment layer instead of a final surface-passivated quantum dot was applied to a quantum dot layer, was manufactured. The quantum dot layer was formed using a $CsPbBr_3$ quantum dot (green), a $CsPbI_3$ quantum dot (red), or a $CsPbClBr_2$ quantum dot (blue) subjected up to the process of forming the pretreatment layer while performing other process equally to those in Example 2.

Evaluation Example 4 (Green)

FIG. 5a to FIG. 5d illustrate results obtained by driving respective quantum dot light emitting diodes in Example 2 and Comparative Example 2 in which the $CsPbBr_3$ quantum dot (green) was used.

(1) Specifically, FIG. 5a is a result obtained by driving each quantum dot light emitting diode depending on a concentration of a ligand solution used in SLE, and it may be confirmed that in the case of a ligand solution having a concentration of 2.5 vol %, optimal luminance was exhibited.

(2) FIG. 5b is a result obtained by driving each quantum dot light emitting diode depending on a concentration of a ligand solution used in SLE and it may be confirmed that in the case of a ligand solution having a concentration of 2.5 vol %, optimal current efficiency was exhibited.

(3) FIG. 5c is a result obtained by driving each quantum dot light emitting diode depending on a concentration of a ligand solution used in SLE, and it may be confirmed that under the condition of a ligand solution having a concentration of 2.5 vol %, a carrier leakage may be minimized.

(4) FIG. 5d is a result obtained by driving each quantum dot light emitting diode depending on a concentration of a ligand solution used in SLE, and it may be confirmed that in the case of a ligand solution having a concentration of 2.5 vol %, optimal current efficiency and luminance were exhibited.

Evaluation Example 5 (Red)

FIG. 6a to FIG. 6d illustrate results obtained by driving respective quantum dot light emitting diodes in Example 2 and Comparative Example 2 in which the $CsPbI_3$ quantum dot (red) was used.

(1) Specifically, FIG. 6a is a result obtained by driving each quantum dot light emitting diode depending on a concentration of a ligand solution used in SLE, and it may be confirmed that in the case of a ligand solution having a concentration of 2.3 vol %, optimal luminance was exhibited.

(2) FIG. 6b is a result obtained by driving each quantum dot light emitting diode depending on a concentration of a ligand solution used in SLE and it may be confirmed that in the case of a ligand solution having a concentration of 1.6 vol %, optimal current efficiency was exhibited.

(3) FIG. 6c is a result obtained by driving each quantum dot light emitting diode depending on a concentration of a ligand solution used in SLE, and it may be confirmed that under the condition of a ligand solution having a concentration of 1.6 vol %, a carrier leakage may be minimized.

(4) FIG. 6d is a result obtained by driving each quantum dot light emitting diode depending on a concentration of a ligand solution used in SLE, and it may be confirmed that in the case of a ligand solution having a concentration of 1.6 vol %, optimal current efficiency and luminance were exhibited.

Evaluation Example 6 (Blue)

FIG. 7a to FIG. 7d illustrate results obtained by driving respective quantum dot light emitting diodes in Example 2 and Comparative Example 2 in which the CsPbClBr₃ quantum dot (blue) was used.

(1) Specifically, FIG. 7a is a result obtained by driving each quantum dot light emitting diode depending on a concentration of a ligand solution used in SLE, and it may be confirmed that in the case of a ligand solution having a concentration of 3.1 vol %, luminance was exhibited.

(2) FIG. 7b is a result obtained by driving each quantum dot light emitting diode depending on a concentration of a ligand solution used in SLE and it may be confirmed that in the case of a ligand solution having a concentration of 2.3 vol %, optimal current efficiency was exhibited.

(3) FIG. 7c is a result obtained by driving each quantum dot light emitting diode depending on a concentration of a ligand solution used in SLE, and it may be confirmed that under the condition of a ligand solution having a concentration of 3.1 vol %, a carrier leakage may be minimized.

(4) FIG. 7d is a result obtained by driving each quantum dot light emitting diode depending on a concentration of a ligand solution used in SLE, and it may be confirmed that in the case of a ligand solution having a concentration of 2.3 vol %, optimal current efficiency and luminance were exhibited.

The present invention is not limited to the embodiments, but may be implemented in various forms, and those skilled in the art will appreciate that the present invention may be implemented in other detailed forms without departing from the spirit or essential feature of the present invention. Therefore, it is to be understood that the embodiments described hereinabove are illustrative rather than being restrictive in all aspects.

The invention claimed is:

1. A surface-passivated quantum dot comprising:
a perovskite quantum dot (PeQD) containing a compound having a perovskite structure, the perovskite quantum dot (PeQD) being represented by the following Chemical Formula 1; and
a surface treatment layer positioned on a surface of the quantum dot and including an organic ligand represented by the following Chemical Formula 2 and an organic ligand represented by the following Chemical Formula 3, $$ABX^1_3 \quad \text{[Chemical Formula 1]}$$

in Chemical Formula 1,
A is one of CH₃NH₃, NH₂CH=NH₂, Cs, Rb, Ba, In, K and Tl,
B is one element of Pb, Sn, Bi, Ag, Ge and Zr, and
X¹ is one element of F, Cl, Br and I,

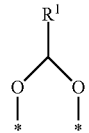

[Chemical Formula 2]

in Chemical Formula 2,
R¹ is a substituted or unsubstituted C6-C20 aryl group, and
moieties indicated by * are each bound to the surface of the quantum dot,

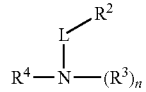

[Chemical Formula 3]

in Chemical Formula 3,
L is any one of C1-C5 alkylene groups,
R² to R⁴ are each any one of hydrogen, deuterium, tritium, a substituted or unsubstituted C1-C6 alkyl group, and a substituted or unsubstituted C6-C20 aryl group, and
n is 0 or 1.

2. The surface-passivated quantum dot of claim 1, wherein:
N of the organic ligand represented by Chemical Formula 3 is bound to the surface of the quantum dot.

3. The surface-passivated quantum dot of claim 2, wherein:
the bond is a coordinate bond between an unshared electron pair of N and the quantum dot.

4. The surface-passivated quantum dot of claim 1, wherein:
based on a total amount of the surface-passivated quantum dot, the quantum dot is included in an amount of 1 to 50 wt %, the organic ligand represented by Chemical Formula 2 is included in an amount of 1 to 50 wt %, and the organic ligand represented by Chemical Formula 3 is the balance (0 wt % is exclusive).

5. The surface-passivated quantum dot of claim 4, wherein:
a weight ratio of the organic ligand represented by Chemical Formula 3 to the organic ligand represented by Chemical Formula 2 (the organic ligand represented by Chemical Formula 3/the organic ligand represented by Chemical Formula 2) is 1/99 to 99/1.

6. The surface-passivated quantum dot of claim 1, wherein:
a diameter of the quantum dot is 3 to 30 nm.

7. The surface-passivated quantum dot of claim 1, wherein:
a thickness of the passivation layer is 5 to 500 nm.

8. The surface-passivated quantum dot of claim 1, wherein:
in the surface (100 sq %) of the quantum dot, the passivation layer is distributed in a ratio of 1 to 100 sq %.

9. The surface-passivated quantum dot of claim 1, wherein:
the passivation layer is formed by a solid-state ligand exchange (SLE) reaction.

10. A method of passivating a surface of a quantum dot, the method comprising:

pretreating a surface of the quantum dot by mixing a pretreatment solution containing a fatty acid-based organic ligand, a fatty amine-based organic ligand, and a first organic solvent with a perovskite quantum dot (PeQD) containing a compound having a perovskite structure, the perovskite quantum dot (PeQD) being represented by the following Chemical Formula 1; and inducing a ligand exchange reaction on the surface of the quantum dot by mixing a ligand exchange solution containing an organic ligand represented by $R^1$—COOH, an organic ligand represented by the following Chemical Formula 3, and a second organic solvent with the pretreated quantum dot, wherein in the pretreating of the surface of the quantum dot, a pretreatment layer containing the fatty acid-based organic ligand and the fatty amine-based organic ligand is formed on the surface of the quantum dot, and in the inducing of the ligand exchange reaction on the surface of the quantum dot, the pretreatment layer is removed from the surface of the quantum dot, and at the same time, a final passivation layer containing the organic ligand represented by Chemical Formula 2 and the organic ligand represented by Chemical Formula 3 is formed:

$ABX^1_3$      [Chemical Formula 1]

in Chemical Formula 1,
A is one of $CH_3NH_3$, $NH_2CH=NH_2$, Cs, Rb, Ba, In, K and Tl,
B is one element of Pb, Sn, Bi, Ag, Ge and Zr, and
$X^1$ is one element of F, Cl, Br and I,

[Chemical Formula 2]

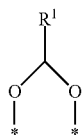

in Chemical Formula 2,
$R^1$ is a substituted or unsubstituted C6-C20 aryl group, and
moieties indicated by * are each bound to the surface of the quantum dot,

[Chemical Formula 3]

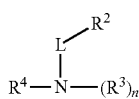

in Chemical Formula 3,
L is any one of C1-C5 alkylene groups,
$R^2$ to $R^4$ are each any one of hydrogen, deuterium, tritium, a substituted or unsubstituted C1-C6 alkyl group, and a substituted or unsubstituted C6-C20 aryl group, and,
n is 0 or 1.

11. The method of claim 10, wherein:
the first organic solvent is one or a mixture of two or more of hexane, toluene, benzene, octane, chloroform, chlorobenzene, dichlorobenzene, ortho-xylene, meta-xylene, and para-xylene.

12. The method of claim 11, further comprising:
after the pretreating of the surface of the quantum dot, removing the first solvent
to obtain the pretreated quantum dot in a solid state.

13. The method of claim 12, wherein:
the second organic solvent includes a main solvent which is octane, heptane, or a combination thereof.

14. The method of claim 13, wherein:
the second organic solvent further includes a sub-solvent which is benzene, toluene, xylene (o, m and p-xylene), or a combination thereof.

15. The method of claim 14, wherein:
a volume ratio of the sub-solvent to the main solvent is 1/99 to 99/1 (sub-solvent/main solvent).

16. The method of claim 15, wherein:
in the inducing of the ligand exchange reaction on the surface of the quantum dot,
0.1 to 100 mg of the pretreated quantum dot is mixed per 1 mL of the ligand exchange solution.

17. The method of claim 16, further comprising:
after the inducing of the ligand exchange reaction on the surface of the quantum dot,
washing the quantum dot on which the final passivation layer is formed with the sub-solvent.

18. A method of passivating a surface of a quantum dot, the method comprising:

pretreating a surface of the quantum dot by mixing a pretreatment solution containing a fatty acid-based organic ligand, a fatty amine-based organic ligand, and a first organic solvent with a perovskite quantum dot (PeQD) containing a compound having a perovskite structure, the perovskite quantum dot (PeQD) being represented by the following Chemical Formula 1;

coating the pretreated quantum dot on a substrate; and inducing a ligand exchange reaction on the surface of the quantum dot coated on the substrate by applying a ligand exchange solution containing an organic ligand represented by $R^1$—COOH, an organic ligand represented by the following Chemical Formula 3, and a second organic solvent on the substrate, wherein in the pretreating of the surface of the quantum dot, a pretreatment layer containing the fatty acid-based organic ligand and the fatty amine-based organic ligand is formed on the surface of the quantum dot, in the inducing of the ligand exchange reaction on the surface of the quantum dot coated on the substrate, the pretreatment layer is removed from the surface of the quantum dot coated on the substrate, and at the same time, a final passivation layer including the organic ligand represented by the following Chemical Formula 2 and the organic ligand represented by the following Chemical Formula 3 is formed:

$ABX^1_3$      [Chemical Formula 1]

in Chemical Formula 1,
A is one of $CH_3NH_3$, $NH_2CH=NH_2$, Cs, Rb, Ba, In, K and Tl,
B is one element of Pb, Sn, Bi, Ag, Ge and Zr, and
$X^1$ is one element of F, Cl, Br and I,

[Chemical Formula 2]

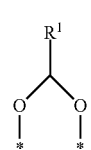

in Chemical Formula 2,

R[1] is a substituted or unsubstituted C6-C20 aryl group, and moieties indicated by * are each bound to the surface of the quantum dot,

[Chemical Formula 3]

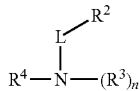

in Chemical Formula 3,

L is any one of C1-C5 alkylene groups,

R[2] to R[4] are each any one of hydrogen, deuterium, tritium, a substituted or unsubstituted C1-C6 alkyl group, and a substituted or unsubstituted C6-C20 aryl group, and n is 0 or 1.

19. The method of claim 18, further comprising:

before the coating of the pretreated quantum dot on the substrate, inducing a partial ligand exchange reaction on the surface of the pretreated quantum dot by mixing the pretreated quantum dot with the ligand exchange solution.

20. The method of claim 19, wherein:

in the inducing of the partial ligand exchange reaction on the surface of the pretreated quantum dot, 0.5 to 20 vol % of the ligand exchange solution is mixed with 100 vol % of the pretreated quantum dot when absorbance of the pretreated quantum dot is 0.1.

21. The method of claim 20, wherein:

in the inducing of the partial ligand exchange reaction on the surface of the pretreated quantum dot, the pretreatment layer is partially removed from the surface of the quantum dot, and at the same time, an intermediate passivation layer in which the remaining pretreatment layer, the organic ligand represented by Chemical Formula 2, and the organic ligand represented by Chemical Formula 3 are mixed, is formed.

22. The method of any one of claim 19, wherein:

the substrate is formed of glass coated with a transparent conductor, poly imide, or polyethylene terephthalate (PET).

* * * * *